US009943899B2

(12) United States Patent
Pilon et al.

(10) Patent No.: US 9,943,899 B2
(45) Date of Patent: Apr. 17, 2018

(54) METHOD FOR BLOW MOLDING METAL CONTAINERS

(71) Applicants: MONTEBELLO TECHNOLOGY SERVICES LTD., Vancouver (CA); 1949467 ONTARIO INC., Kingston (CA)

(72) Inventors: Betty Jean Pilon, Vankleek Hill (CA); Peter Stathopoulos, Roxboro (CA); Georgi Georgiev, Toronto (CA); Benjamin Joseph Pilon, Inverary (CA)

(73) Assignees: MONTEBELLO TECHNOLOGY SERVICES LTD., Vancouver (CA); 1949467 ONTARIO INC., Kingston (CA)

(*) Notice: Subject to any disclaimer, the term of this patent is extended or adjusted under 35 U.S.C. 154(b) by 27 days.

(21) Appl. No.: 14/667,139

(22) Filed: Mar. 24, 2015

(65) Prior Publication Data

US 2015/0273560 A1    Oct. 1, 2015

Related U.S. Application Data

(60) Provisional application No. 61/970,103, filed on Mar. 25, 2014.

(51) Int. Cl.
*B21D 26/049* (2011.01)
*B21D 26/14* (2006.01)
(Continued)

(52) U.S. Cl.
CPC .......... *B21D 26/049* (2013.01); *B21D 15/10* (2013.01); *B21D 51/24* (2013.01); *C21D 1/42* (2013.01);
(Continued)

(58) Field of Classification Search
CPC ...... B21D 15/03; B21D 15/10; B21D 22/022; B21D 22/025; B21D 26/00; B21D 26/02;
(Continued)

(56) References Cited

U.S. PATENT DOCUMENTS 2,756,876 A   7/1956   Watson et al.
2,904,173 A   9/1959   Braun et al.
(Continued)

FOREIGN PATENT DOCUMENTS

CA   2445582 A1   11/2002
EP   2859966 A1   4/2015
(Continued)

OTHER PUBLICATIONS

International Search Report and Written Opinion for Application No. PCT/CA2015/051378, dated Mar. 15, 2016, 12 pages.
(Continued)

*Primary Examiner* — Peter DungBa Vo
*Assistant Examiner* — Joshua D Anderson
(74) *Attorney, Agent, or Firm* — Borden Ladner Gervais LLP

(57) ABSTRACT

A method is disclosed for pressure forming a metal preform including shock annealing of the preform and subsequently preheating the preform prior to pressure forming. Shock annealing may be carried out as differential shock annealing in which different regions of the preform are annealed to different degrees. Preheating may be carried out by differentially preheating, optionally shock preheating, different regions of the preform for preheating at least those regions of the preform which will be subject to elevated expansion during pressure forming. Shock annealing by induction heating can lower energy consumption, reduce processing times and allow for larger expansion of the preform.

19 Claims, 18 Drawing Sheets

(51) Int. Cl.
| | |
|---|---|
| *C21D 1/42* | (2006.01) |
| *C21D 9/00* | (2006.01) |
| *C22C 21/00* | (2006.01) |
| *C22F 1/04* | (2006.01) |
| *H05B 6/10* | (2006.01) |
| *B21D 15/10* | (2006.01) |
| *B21D 51/24* | (2006.01) |
| *C21D 9/08* | (2006.01) |
| *C21D 7/12* | (2006.01) |
| *C21D 1/26* | (2006.01) |

(52) U.S. Cl.
CPC ............... *C21D 7/12* (2013.01); *C21D 9/08* (2013.01); *C22C 21/00* (2013.01); *C22F 1/04* (2013.01); *H05B 6/101* (2013.01); *C21D 1/26* (2013.01); *C21D 9/0068* (2013.01); *C21D 2221/00* (2013.01); *C21D 2221/10* (2013.01); *Y02P 10/253* (2015.11); *Y10T 29/49805* (2015.01)

(58) Field of Classification Search
CPC .. B21D 26/033; B21D 26/047; B21D 26/049; B21D 31/04; B21D 35/002; B21D 37/16; B21D 39/08; B21D 39/20; B21D 39/203; B21D 51/24; B21D 51/26; B21D 51/2646; Y10T 29/49805; C22F 1/04; B21C 23/00; B21C 23/18; B21C 23/186; B21C 23/20; C21D 1/26; C21D 1/28; C21D 1/30; C21D 1/32; C21D 1/42; C21D 7/12; C21D 8/10; C21D 9/0068; C21D 9/08; C21D 2221/00; C21D 2221/01; C21D 2221/10; H05B 6/02; H05B 6/101; H05B 6/103; H05B 6/36; H05B 6/38; H05B 6/40; Y02P 10/253
USPC ... 72/54, 57, 58, 60, 61, 62, 63, 253.1, 256, 72/264, 266, 267, 342.1, 342.5, 342.6, 72/342.94, 364, 368, 370.01, 370.06, 72/370.16, 370.19, 370.22, 715; 29/421.1; 148/567; 219/643
See application file for complete search history.

(56) References Cited

U.S. PATENT DOCUMENTS

| | | | |
|---|---|---|---|
| 3,263,468 A | 8/1966 | Rowell | |
| 3,738,528 A | 6/1973 | Kagami | |
| 5,058,408 A | 10/1991 | Leftault, Jr. et al. | |
| 5,214,258 A * | 5/1993 | Akers | C21D 9/60 219/645 |
| 5,377,518 A | 1/1995 | Abbott | |
| 5,542,277 A | 8/1996 | Dunwoody | |
| 5,570,806 A | 11/1996 | Abbott | |
| 5,611,454 A | 3/1997 | Abbott | |
| 5,776,270 A | 7/1998 | Biondich | |
| 5,832,766 A | 11/1998 | Hartman et al. | |
| 5,992,197 A | 11/1999 | Freeman et al. | |
| 6,349,583 B1 * | 2/2002 | Kleinschmidt | B21D 26/041 29/421.1 |
| 6,349,586 B1 | 2/2002 | Johnson et al. | |
| 6,387,198 B1 * | 5/2002 | Suzuki | B41N 1/083 148/552 |
| 6,802,196 B2 | 10/2004 | Gong et al. | |
| 7,107,804 B2 | 9/2006 | Gong et al. | |
| 7,117,704 B2 | 10/2006 | Ogura | |
| 7,291,817 B2 * | 11/2007 | Weiss | H05B 6/06 219/653 |
| 2002/0162371 A1 | 11/2002 | Hamstra et al. | |
| 2006/0060115 A1 | 3/2006 | Hagino | |
| 2011/0113732 A1 | 5/2011 | Adams et al. | |
| 2011/0167886 A1 | 7/2011 | Mallory et al. | |
| 2013/0167607 A1 | 7/2013 | Adams et al. | |
| 2016/0256910 A1 | 9/2016 | Niec et al. | |

FOREIGN PATENT DOCUMENTS

| | | |
|---|---|---|
| JP | S6255937 B2 | 11/1987 |
| WO | 2002087802 A1 | 11/2002 |
| WO | 2013040339 A1 | 3/2013 |

OTHER PUBLICATIONS

International Search Report and Written Opinion for Application No. PCT/CA2015/000180, dated Oct. 6, 2016, 8 pages.
International Application No. PCT/CA2015/000180, International Search Report and Written Opinion dated Jul. 21, 2015.
International Patent Application No. PCT/CA2015/051378, International Preliminary Report on Patentability dated Mar. 30, 2017.
European Patent Application No. 15769617.0 Supplementary Partial European Search dated Dec. 14, 2017.

* cited by examiner

METHOD FOR BLOW MOLDING METAL CONTAINERS

This application claims priority under 35 U.S.C. § 119(e) to U.S. Provisional Patent Application Ser. No. 61/970,103, filed Mar. 25, 2014, which is incorporated herein in its entirety by reference.

The invention relates to methods and apparatus for forming metal containers or the like, utilizing internal fluid pressure to expand a hollow metal preform or workpiece against a die cavity, to produce a container having a contoured shape.

Metal cans used for beverages and the like are either one-piece bodies, or bodies open at one or both ends and closed at those top and bottom ends by separate parts. Conventional cans generally have simple upright cylindrical sidewalls. For reasons of aesthetics, consumer appeal or product identification, it may be desired to impart the can with a more complex shape. For example, it may be desired to provide a metal container in the shape of a bottle rather than an ordinary cylindrical can shape, or to provide an ergonomically shaped bottle akin to already available shaped plastic or glass bottles.

Aluminum containers have been conventionally formed using various different approaches. In one approach, a progressive series of dies is used to draw, re-draw or shape a flat plate or metal sheet into a preform in the shape of a cylinder with a closed bottom. The preform can then be provided with a top lid to form a can or drawn by and necked using necking dies into a bottle shape. The container open end is curled and can be threaded for mounting a closure cap. In another approach, a preform is formed from a metal sheet that is rolled and welded to form a cylinder with opposite open ends, welding a bottom onto the cylinder and either closing the top end or drawing and necking the top end into a bottle shape.

In an alternative aluminum container forming method, a preform is impact extruded from an aluminum slug, as described in WO 2013040339 A1 by Stiles et al. Impact extrusion is a process utilized to make metallic containers and other articles with unique shapes. The products are typically made from a metal slug comprising steel, magnesium, copper, aluminum, tin or lead. The container is formed inside a confining die from a cold slug which is impacted by a punch. The force of the punch impact deforms the metal slug around the punch and forces the slug material backwards between the punch and the die wall, opposite to the direction of punch movement. After the initial preform shape, a cylinder with closed bottom, is created, the preform is removed from the punch with a counter-punch ejector. Necking, or necking and shaping, tools are used to form the preform into a preferred shape. Embossing tools may also be used to generate three-dimensional structures within the container wall.

Impact extruded containers include aerosol containers and other pressure vessels, as well as traditional aluminum beverage containers. Aerosol containers and pressure vessels generally require high strength and use thicker gauge materials than traditional aluminum beverage containers. The top end of the preform can be drawn, rolled, or necked to form a bottle shape.

In the shaping methods described above, the preform is necked or shaped by mechanical means. In an alternative shaping process, the preform approximates the final container shape and a pressurized fluid (gas or liquid) is used to expand the preform in a mold. This is generally referred to as pressure forming, or blow molding where pressurized gas is used. Examples of known methods of blow molding preforms into aluminum containers are found in the publications of: U.S. Pat. No. 7,107,804 dated Sep. 19, 2006; U.S. Pat. No. 6,802,196 dated Oct. 12, 2004; and US Application Publication 2011/0167886 dated Jul. 14, 2011.

Pressure Ram Forming (PRF)

U.S. Pat. No. 7,107,804 discloses a special blow molding process, the pressure-ram-forming process, or PRF. In PRF, a metal container of defined shape and lateral dimensions is formed both by fluid pressure, applied either internally or internally and externally, and by the translation of a ram driven by a shaft. In the method disclosed, a hollow metal preform formed by a draw, re-draw or back extrusion process from a metal sheet and having a closed end, is placed in a die cavity laterally enclosed by a die wall defining the shape and lateral dimensions of the finished container. A ram located at one end of the die cavity is translatable into the cavity. The preform is generally cylindrical and is subjected to the fluid pressure to expand the preform outwardly into substantially full contact with the die wall. This imparts the defined shape and lateral dimensions to the preform in one single forming step. Any stretching, bending, shaping or other deformation of the preform material required for transition from the preform shape to the final shape occurs during a continuous, single shaping operation. Thus, extreme stress may be imparted on the preform material during shaping, especially for final shapes that require bulging of the preform sidewall into an expanded shape and formation of a relief of protruding or recessed shapes on the expanded shape. After the preform begins to expand but before expansion of the preform is complete, the ram is translated into the cavity to deform the closed end of the preform inward.

Annealing Prior to Shaping

Containers of more complex shape can be manufactured with different shaping methods, for example embossing, roll forming, electromagnetic forming, hydroforming or pressure forming, such as the pressure-ram-forming method. However, work hardening of the preform material either before or during forming of the preform, which is a result of the strain imposed on the aluminum, can lead to integrity problems during the subsequent shaping operation. Annealing of the preform material to increase ductility prior to shaping can be carried out by heating the preform.

Annealing of a metal workpiece generally involves heating the material of the workpiece to above its glass transition temperature and below its melting point, and then cooling. The material is commonly maintained at a selected annealing temperature for a specific dwell time intended to allow for removal of dislocations, realignment of grains in the material, and subsequent recrystallization of the grains to form a homogeneous, equiaxed grain structure. Annealing can induce ductility, soften the material, relieve internal stresses, refine the structure by making it homogeneous, and improve cold working properties. After annealing, objects must be cooled to stop the annealing process and limit grain growth. If the material is maintained at the selected annealing temperature past the point where recrystallization is complete, grain growth will occur, which is disadvantageous, since the microstructure of the material starts to coarsen as a result, which may cause the material to lose a substantial part of its original strength.

Preforms manufactured from sheet material can be annealed to reduce the effect of work hardening and to make the preforms more ductile. A recovery anneal can be carried out on the starting sheet material prior to drawing of the preform, or on the preform itself, prior to the shaping step.

Annealing of the preform during a can forming process for the purpose of relaxing the material in the sheet material based preform (recovery anneal) is disclosed in CA 2,445,582 by Moulton et al. Annealing of the sheet material prior to the forming of the preform is suggested in U.S. Pat. No. 7,107,804, while relaxing of the preform material prior to blow molding is disclosed in CA 2,445,582 and US2011/0113732A1.

In all of these methods, the annealing is carried out by subjecting the starting material or preform to externally applied heat, for example in an annealing oven or furnace. This convective heating by the external application of heat (hot air, etc.), is sufficient to relax the material. However, annealing by convective heating is time consuming and inefficient, since a significant portion of the heat supplied may be lost to the environment and not transferred to the preform. Moreover, in order to ensure sufficient annealing of all areas of the material, the dwell time used is often longer than the time theoretically required to achieve the desired degree of anneal. This may lead to over-annealing, or to grain growth in the material being annealed, causing a progressive loss in material strength.

The use of inductive heating for the partial annealing of preforms drawn or re-drawn from sheet material is suggested in U.S. Pat. No. 5,058,408 and U.S. Pat. No. 6,349,586. Although the use of inductive heating is disclosed, only a partial anneal of the sheet material is achieved.

Annealing of an impact extruded preform is suggested in U.S. Pat. No. 5,776,270. In the container shaping method disclosed, multiple expansion steps are used to shape aluminum containers having highly contoured sidewalls not producible with prior expansion methods. An annealing treatment of the sidewall is carried out prior to each expansion step in order to avoid rupture of the sidewall during the subsequent expansion step. The annealing treatment is carried out by inductive heating of the sidewall. The preform is first partially or fully annealed (to 0 temper), subjected to a first expansion, annealed again and then subjected to a second expansion. Inductive heating is used to heat the preform material. The multiple expansion process is required to enable an expansion of more than 23.7%. All examples are limited to drawn and ironed preforms. Impact extruded preforms were not tested. Full annealing of the drawn and ironed preforms was achieved by inductively heating the preform to 625° F. for 30 minutes. This process requires multiple shaping steps and is therefore not usable in connection with PRF.

Preheating Prior to Shaping

Independent of any annealing of the preform material, the preform can also be preheated just prior to pressurization to make the preform material more ductile and prevent cracking or structural failure of the container wall. Selective preheating of different regions of the preform prior to deformation and/or expansion during the PRF process is disclosed in U.S. Pat. No. 7,107,804. In the disclosed process, heat is transferred to the preform by contact with a heated object, for example the forming ram. Sectional pre-heating of the body of the preform by convective heating between the top and bottom ends is also possible and disclosed in US2013/0167607A1 and WO 2002087802 A.

Preheating selected regions of a pipe preform by induction heating for the purpose of thickening the pipe wall during forming is disclosed in U.S. Pat. No. 5,992,197 by Freeman et al. However, this type of preheating requires the use of a continuous preform and is not applicable for preform expansion by pressure forming.

Surface Finish

Aluminum containers generally require an interior coating or lacquer to prevent corrosion and spoiling of the contents, or for sanitary reasons. The exterior of the container generally also requires a coating for durability, labeling, decorative appearance and marketing reasons. The application of interior or exterior coatings after blow molding the container into complex shapes is difficult. Since the preform generally has a simple cylindrical shape it is preferred to apply the coatings to the preform before blow molding. However excessive preheating of the preform prior to blow molding can damage those coatings.

It is an object to address at least one disadvantage of the prior art processes and apparatus.

SUMMARY OF THE INVENTION

During impact extrusion of a slug, significant shear stresses are imposed on the slug material. These shear stresses are much higher than those occurring during drawing, redrawing or back extrusion of a sheet material. The dislocation density in a metal increases with plastic deformation. The shear stresses created during impact extrusion result in a much higher dislocation density in an impact extruded preform than in a sheet-based preform. The higher the dislocation density, the harder the material and the more resistant it becomes to further deformation. This effect is called work hardening. In the context of this specification, the term metal slug is used to define flat, beveled, or domed discs of extrudable metal material having a circular, regular, or irregular circumference. Impact extruded workpieces are known to be subject to significant work hardening and to a very high dislocation density. Moreover, impact extruded preforms generally have a higher wall thickness than sheet based preforms. Therefore, an impact extruded preform will be subject to localized failure of the preform material upon further deformation, especially expansion, without annealing of the preform material. However, heating to anneal an impact extruded preform by convection is inefficient. Heating by induction required multiple annealing steps in the past, thus making impact extruded preforms impractical for use in PRF.

Shock Annealing

The inventors have now surprisingly discovered that an impact extruded preform can be used in the PRF process, wherein the preform material is shock annealed prior to expansion, and that the use of shock annealing obviates the need for multiple annealing steps.

Shock annealing in the context of this description is defined as rapidly heating the metal material to be annealed to achieve a temperature rise in the material of at least 120° C./sec. The rapid heating is carried out to achieve a preselected final annealing temperature in the range of 65%-98% of the melting point temperature of the metal. A temperature rise of at least 150° C./sec was found advantageous, or at least 200° C./sec, for example 235° C./sec to 245° C./sec. After sufficient heating time to reach the preselected final annealing temperature, the heating is stopped and the material is allowed to cool. Shock annealing is most advantageously achieved by using inductive heating. Advantageous results are achieved with an electromagnetic field of a power density of 25 to 100 W/cm$^2$ of preform sidewall surface. Power densities in the range of 40 to 90 W/cm$^2$ have been found advantageous, for example 86 W/cm$^2$. This may be achieved with a power input into the induction coil in the range of 10 kW to 20 kW, for example 15 kW. Treatment times may lie in the range of 0.3 to about 4 seconds, advantageously in the range of 0.8 to 2.5 seconds, for example 2 seconds.

In one aspect, the invention provides a method of shock annealing a metal preform by inductively heating the preform material by generating an electro-magnetic field and exposing the preform to the electro-magnetic field to generate a temperature rise in the preform material of at least 120° C./sec to reach an annealing temperature in the range of 65%-98% of the melting point temperature of the preform material. In certain embodiments, a temperature rise of 220-250° C./sec, for example 235-245° C./sec, is generated in an aluminum preform to reach an annealing temperature of about 500-520° C., for example 510° C., which equates to about 90% of the melting point temperature, in about 2 seconds.

In the context of this specification, the term electro-magnetic field refers to a field generated by passing an alternating current (inductive current) through a conductor, advantageously in the shape of a coil. The term metal preform in the context of this specification includes a preform made of steel, magnesium, copper, aluminum, tin or lead, or alloys thereof, and formed from sheet material by a draw, re-draw, deep draw, machining, casting, or back extrusion process, or formed by impact extrusion from a slug. The term aluminum in the context of this specification includes substantially pure aluminum as well as aluminum alloys of for example the 1000, 2000, 3000, 4000, 5000, 6000, 7000 or 8000 Series, for example 1000 Series or 3000 Series Alloys, such as 1070, 1050, 1100 and 3207 Alloys.

The penetration depth of the electro-magnetic field into the material to be annealed is influenced by the frequency of the inductive current used to generate the electro-magnetic field for the induction heating. Lower frequencies provide deeper penetration, whereas higher frequencies result in shallower penetration into the material. The frequency of the alternating current used for generation of the electro-magnetic field also influences the efficiency of the heating, with frequency and efficiency being inversely related. Although lower frequencies theoretically benefit both penetration and efficiency, an increase in heating efficiency also increases the risk of localized overheating of the material due to tolerances in the material thickness. Frequencies in the range of 10 kHz to 600 kHz can be used in certain embodiments of the present invention, with frequencies in the range of 100 kHz to 400 kHz, or 200 kHz to 300 kHz, for example 300 kHz, being advantageous to reduce localized overheating.

The inventors have further surprisingly discovered that, despite the significant dislocation density in the material of an impact extruded preform, an impact extruded preform that is shock annealed as described above, optionally advantageously including differentially shock annealed regions, can be successfully used for forming with the PRF process. The term differentially shock annealed regions as used in this disclosure defines adjacent regions of the preform which differ in the degree of annealing, wherein the degree of annealing can range from partial annealing to full annealing, as long as those regions expected to be subject to the largest expansion or deformation during subsequent shaping, have been substantially fully annealed. The inventors have found that substantially fully shock annealing only those regions of the preform which are subject to elevated strain during molding is sufficient for most embodiments. This can speed up the forming process and reduce power consumption.

In another aspect, the invention provides a method of differentially shock annealing a metal preform by inductively shock annealing the preform material in at least one region to a lesser degree than in the remainder of the preform material, which remainder is inductively heated to achieve a temperature rise in the material of at least 120° C./sec to reach an annealing temperature in the range of 65%-98% of the melting point temperature of the metal.

In a further aspect, the invention provides a differentially shock annealed metal preform that has been impact extruded from a metal slug and subjected to differential shock annealing as described above.

Preheating

The inventors have also surprisingly found that, subsequent to annealing of the preform, a differential preheating of adjacent regions of the preform, wherein elevated three-dimensional deformation during the PRF process will occur, can assist in the creation of smaller deformation radii and higher three-dimensional relief features, due to the regions of less or no preheating providing a higher resistance to deformation than those substantially fully preheated. Preheating can be most effectively achieved by shock preheating with induction. Shock preheating in the context of this description is defined as rapidly heating the metal material to be preheated to achieve a temperature rise in the material of at least 120° C./sec, and to reach a final preheating temperature in the range of 100° C. to 300° C., or 150° C. to 250° C., for example 200° C.

In a further aspect, the invention provides a method of differentially preheating a previously differentially shock annealed or substantially fully shock annealed preform by inductively shock preheating any regions of the preform which will be subject to elevated deformation stress during subsequent blow molding.

Molding Process

In yet another aspect, the invention provides a method of making a molded metal container of a desired shape from a preform having a cylindrical body with an open end and a closed end, for example a preform having been impact extruded from a metal slug. The method includes the steps of shock annealing the preform prior to pressurizing by inductively heating the preform material to achieve a minimum temperature rise in the material of at least 120° C./sec, advantageously at least 150° C./sec, for example at least 200° C./sec, or 235° C./sec, to reach an annealing temperature in the range of 65%-98%, for example 90%, of the melting point temperature of the metal; fluid pressure forming the annealed preform in a shaping die or mold with a die cavity defining the desired shape; pressurizing the preform to expand the preform into contact with the die cavity and impart the desired shape onto the preform; and removing the resulting molded container from the die. For aluminum or aluminum containers, the temperature rise can be for example about 250° C./sec.

The terms die, mold, shaping die and shaping mold are interchangeably used throughout this specification and all define the structure in which the preform is subjected to pressure forming.

In still another aspect, the invention provides a method of fluid pressure molding a metal container of a desired shape from a preform having a cylindrical body with an open end and a closed end, for example a preform having been impact extruded from a metal slug, the method including the steps of differentially shock annealing the preform prior to pressurizing by inductively heating the preform material in at least one region to a lesser degree than the remainder of the preform material which remainder is inductively heated to achieve a temperature rise in the material of at least 120° C./sec, advantageously at least 150° C./sec, for example at least 200° C./sec, or 235 to 245° C./sec to reach an annealing temperature in the range of 65%-98%, for example 90%, of the melting point temperature of the metal; fluid pressure forming the annealed preform in a die with a die cavity defining the desired shape; pressurizing the preform to expand the preform into contact with the die cavity and impart the desired shape onto the preform; and removing the resulting molded container from the die.

In yet a further aspect, the invention provides a method for fluid pressure molding a metal container of a desired shape from a preform having a cylindrical body with an open end and a closed end, for example a preform having been impact extruded from a metal slug, the method including the steps of differentially preheating a previously shock annealed or differentially shock annealed preform prior to pressurizing by inductively preheating regions of the preform which will be subject to elevated deformation stress during subsequent fluid pressure forming; fluid pressure forming the annealed preform in a die with a die cavity defining the desired shape, the preform being placed in the die either before or after preheating; pressurizing the preform to expand the preform into contact with the die cavity and impart the desired shape onto the preform; and removing the resulting molded container from the die.

In addition, the inventors have discovered that a preform with regions of variable wall thickness can be successfully induction heated by shock heating (shock preheating or shock annealing) each region individually, since this will avoid the significant and undesirable local temperature spikes generated when regions of different wall thickness are subjected to a uniform electro-magnetic field.

Due to field strength variations in an electro-magnetic field used for induction heating (for shock annealing or shock preheating purposes) heat generation through induction may be locally variable, which can lead to localized temperature spikes within the preform material. Although the overall field strength can be lowered to avoid exceeding a desired temperature, doing so increases the heating time and conductive losses and expands the region of the preform which is heated. Thus, selectively and uniformly heating only limited regions of the preform to a specific temperature is difficult. However, the inventors of the present application have now surprisingly discovered that energy consumption can be further reduced and the inductive heating of the preform limited to more precisely defined, smaller regions of the preform, by moving the electro-magnetic field in relation to the preform. That means the preform can be moved within or through the field, or the field can be moved along the preform, or both.

By moving the field relative to the preform, localized strength variations in the field no longer create localized temperature spikes, since all regions of the preform subjected to the moving field are subjected to all field strength variations. Moreover, the movable field allows for the localized shock heating of selected regions without heating adjacent regions by switching the field on and off during movement, which enables differential annealing and/or differential preheating of the preform.

By movement of the electro-magnetic field over the preform, it is achieved that only the region of the preform subjected to the field at any given time is inductively heated, while other regions of the preform are not. That allows for a much more precise control of the amount of energy delivered to any particular region of the preform, since the remainder of the preform acts as a heat sink. This makes it possible to shock anneal and/or shock preheat only those regions of the preform in which shock annealing and/or shock preheating of the material is critical for subsequent forming operations, such as cold forming, roll forming, or blow molding. This speeds up the annealing and/or preheating process and reduces overall energy consumption.

In addition, whereas the amount of energy delivered with a stationary field can only be controlled by the attributes of the current in the coil, using a moving field allows for control in several different ways. The speed of heating of a particular region can be controlled by the attributes of the current in the coil and the speed of movement of the field. Thus, the heating and cooling cycles of selected regions can be shortened by making the field stronger than needed to reach the annealing temperature within a given time, and moving the field to control the amount of time any particular region of the preform is exposed to the field. That allows for a much faster completion of the heating (shock annealing or shock preheating) step. Using a more focused and/or stronger field at a higher rate of displacement also allows for a more precise definition of the region heated at any given time than with a stationary coil. Thus, by moving the field, a very precise control of the heating process is possible. In addition, using a moving field is advantageous over the simultaneous use of multiple stationary fields, since heating individual regions in parallel has the disadvantage that the regions of the preform located between the individually heated regions are subject to waste heat (due to conduction), which makes it difficult to precisely control the amount of heat generated at a specific location of the preform.

In still another aspect, the invention provides a further improved method for fluid pressure molding a metal container from a preform having a substantially cylindrical sidewall, an open end and a closed end, for example a preform having been impact extruded from a metal slug. The method includes the selective shock annealing of individual regions of the preform with an electro-magnetic field and subsequent movement of the same or a different electro-magnetic field relative to the preform for selectively shock preheating at least a region of the preform prior to further forming of the preform.

In one embodiment, the electromagnetic field is also variable in strength. This combines the advantages of the movable field with the advantages of variable inductive heating of individual regions. This is particularly advantageous for the induction heating (for shock annealing or shock preheating) of regions in the preform which have different wall thickness. Moreover, even if only a single electro-magnetic field is used, a pattern of substantially fully annealed and partially annealed regions (slices) and/or preheated regions (slices) can be created in the preform by varying the field strength as the field moves axially relative to the preform.

In another embodiment, shaped induction coils are used which generate a shaped field. The shaped field is used to generate a shaped pattern of differently heated regions in the preform for shock annealing or shock preheating. The pattern may be asymmetric.

In still another embodiment, a pattern of differently heated (shock annealed or shock preheated) regions in the preform is generated by using induction coils inside and/or outside the preform. The pattern may be asymmetric.

In yet another embodiment, an asymmetric pattern of heating is achieved by moving the electro-magnetic field in more than one axis of the preform.

In one embodiment, the method further includes the steps of adding a coating on at least one of an interior surface of the preform (lacquer, powder coat, etc.) and an exterior surface of the preform (powder coat, paint, label, sprayed or printed image, adhesive label, flex label, etc.). A label can also be printed onto the exterior surface of the preform. The method can also include the additional steps of cold working an upper portion of the preform adjacent the open end to form a neck, and trimming and curling an upper edge of the preform adjacent to the open end. If a coating is provided on one or more of the interior or exterior surfaces of the preform, shock preheating can be used to heat the material of the preform to a temperature in excess of the curing temperature of the coating and even to a temperature in excess of the temperature at which heat damage to the coating would theoretically commence. Moreover, since the coating is in contact with the preheated preform material with only one of its surfaces, some cooling of the coating or label occurs on the surface exposed to ambient conditions, so that even elevated temperatures on the contact surface which are somewhat above the temperature at which heat damage will occur will not lead to a complete heating through of the coating, thereby avoiding heat damage. This is especially the case when a relatively moving electromagnetic field is used, since the local temperatures of the preform can be controlled much more precisely than with a stationary field and temporally much shorter heat spikes can be generated. As discussed above in relation to the annealing step, a desired temperature can be achieved more quickly and much shorter heating and cooling cycles can be achieved with a moving electro-magnetic field, which means the time during which the coating is exposed to the preheat temperature and, thus, potential damage to the coating, can be reduced by using a moving field. As previously stated, a moving electro-magnetic field can be achieved by moving the field, or the field generating coil, in relation to the coated preform, by moving the preform in the field, or by doing both.

In a preferred embodiment, shaped induction coils are used which generate a shaped field to generate a pattern of differently preheated regions in the coated preform. The pattern may be asymmetric.

In still another embodiment, a pattern of differently preheated regions in the coated preform is generated, by using induction coils inside and/or outside the coated preform. The pattern may be asymmetric.

Shaping Die

The inventors have also discovered that the use of a die made of heat insulating material can be advantageous, to overcome the heat sink problem created by the use of a metal die. The inventors have discovered that the high conductivity and heat sink capacity of a metal die can in some cases distort the preheating pattern of a preheated preform, even without contact between the preform and the die. Moreover, when the preform is pre-heated after insertion into the shaping (blow molding) die, a portion of the preheating energy will be lost to the large heat sink capacity of a metal shaping die, potentially increasing energy consumption and/or treatment times during preheating. Also, a metal die may interfere with the induction heating of a preform in the die, for example by distortion of the electromagnetic field. Thus, the die material is advantageously electrically non-conductive.

In another aspect, the invention provides a shaping die for use in a method of blow molding a metal container, which shaping die has a die cavity defining a shape into which the container is to be molded, and is mainly made of a material with lower thermal conductivity than metal, for example a heat insulating material and/or electrically insulating material. In one embodiment, the die is made of a hard plastic material, such as a phenolic resin, or other thermoset plastic materials.

Molded Container

The molding process of the present invention enables production of blow molded containers from an impact extruded preform with cylindrical sidewall having a first (starting) diameter, which shaped containers have an expanded sidewall defining an overall shape of the container and expanded to a second diameter (expanded diameter) that is 20% to 50% larger than the first diameter, and a three-dimensional relief structure in the expanded sidewall, the three-dimensional relief structure including at least one relief feature (protrusion and/or recess) deformed from the expanded sidewall to a relative elevation (height of protrusion or depth of recess) of 0.1-10% of the second diameter at the location of the relief feature, the relief feature including at least one edge with a bending radius of 0.3-5 mm.

In one embodiment, the expanded sidewall has a second diameter 20-45% larger than the first diameter.

In another embodiment, the relief feature has a relative elevation of 5-10% and the edge has a bending radius of 0.3-3 mm.

In a further embodiment, the blow molded container includes at least one relief feature in the form of a protrusion directly adjacent at least one relief feature in the form of a recess.

In still another embodiment, the blow molded container has an overall molded shape asymmetrical to a longitudinal axis of the container.

BRIEF DESCRIPTION OF THE DRAWINGS

In order that the invention may be readily understood, an exemplary embodiment of the invention is illustrated by way of example in the accompanying drawings.

Figure 1:
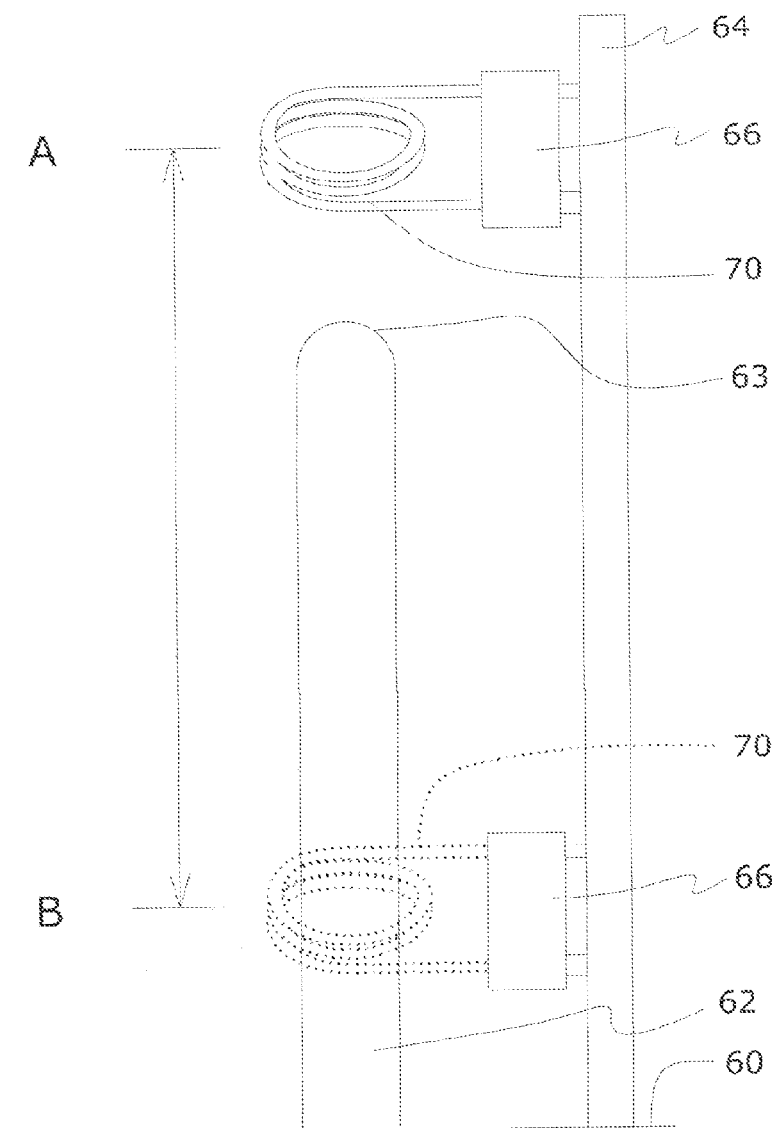
FIG. 1 is a schematic view of a tooling setup for the shock annealing method in accordance with the invention, including a stationary mandrel and a movable induction coil.

Further details of the invention and its advantages will be apparent from the detailed description included below.

DETAILED DESCRIPTION OF EXEMPLARY EMBODIMENTS

Conventional container forming processes for making a shaped container from a preform made from sheet material, as described, for example, in US2011/0167886 (incorporated by reference herein in its entirety), generally include the steps of shaping a preform drawing, re-drawing or back extrusion of a sheet material, subjecting the preform material to a recovery anneal, coating and/or labelling of the preform and expanding of the preform to the final desired shape, for example with a pressure-ram-forming process.

Impact extruded preforms made by impact extrusion from a metal slug are known. However, the use of an impact extruded preform in a pressure forming process, for example a ram forming process, although suggested in US2011/0113732A1 has proven excessively difficult to accomplish.

The inventors have now surprisingly found that the use of an impact extruded preform in a pressure forming process, especially the pressure-ram-forming process in which all expansion of the preform is achieved in a single forming step, can in fact be achieved if the preform is shock annealed prior to expanding it by pressure forming. Moreover, the inventors have developed a process to differentially shock anneal the preform. An exemplary embodiment of the shock annealing method in accordance with the invention, as well as the differential shock annealing process, will be discussed in more detail below with reference to FIGS. 1 to 5.

The inventors have also discovered that preheating, especially differential preheating, of the preform prior to pressure shaping for preheating, at least those regions of the preform which will be subjected to elevated expansion during pressure forming, allows for the creation of a three-dimensional relief structure on the shaped container previously not achievable. An exemplary embodiment of a differential preheating process in accordance with the invention will be described in more detail below with reference to FIGS. 7 to 10.

An exemplary embodiment of a modified PRF process in accordance with the invention including an inductive preheating of a shock annealed preform prior to pressure expansion will be described in more detail below with reference to FIGS. 6 to 11.

During testing of the modified PRF process in accordance with the invention, the inventors have further discovered that the use of a shaping die made at least in part of a material having a thermal conductivity lower than that of metal is advantageous for use in the modified PRF process in accordance with the invention. For example a shaping die or shaping mold made of a material which is also electrically non-conductive is advantageous for use when the preform is inductively preheated while suspended in the mold. An exemplary embodiment of a shaping die or mold in accordance with the invention will be described in more detail below with reference to FIG. 6.

The modified PRF process in accordance with the invention enables the production of a shaped metal container from an impact extruded preform and with a shape and three-dimensional relief features previously not achievable. Exemplary shaped containers in accordance with the invention will be discussed in more detail below with reference to FIGS. 12 to 20.

Shock Annealing

Blow molding of a preform can result in regions of significant material deformation and/or expansion. In order to avoid material failure in those regions, annealing of the preform to increase the ductility is used. The inventors have observed that although conventional type full annealing of the preform by convection heating, in an oven or the like, increases the ductility of the preform, convection heating has several disadvantages. Convective heating is associated with low energy efficiency due to heat losses to the environment and the need for heating not only the preform material, but the space surrounding it. Heating of the preform may also be uneven, leading to uneven annealing of the preform. The same problem can occur with preforms having variations in wall thickness. Moreover, although increasing the annealing temperature and/or dwell time will result in more even annealing of the preform, other, potentially even more serious problems may occur.

Theoretically, the higher the annealing temperature and/or the longer the dwell time, the more complete and even the anneal of the preform material. However, the closer the annealing temperature used is to the melting temperature, the higher the risk of deformation of the preform due to softening of the preform material. In addition, even at annealing temperatures that do not necessarily cause deformation of the preform, extended dwell times can lead to warping of the preform and/or grain growth in the crystalline structure of the preform material leading to a loss in material strength. Deformed or warped preforms or preforms with reduced material strength are undesirable for use in the subsequent shaping of the preform, especially in blow molding.

The inventors have now discovered an advantageous annealing process that allows the use of significantly higher annealing temperatures than conventionally used, without the deleterious effects of deforming and warping. The inventors have also discovered that more aggressive shaping of the preform is made possible with this process than with conventional full annealing methods. The annealing method of the invention is based on shock heating of the preform material to reach the desired annealing temperature in a very short amount of time, within seconds, while at the same time the desired annealing temperature is higher than conventionally used. This annealing method, referred to throughout this application as shock annealing, requires the heating of the preform material to achieve a temperature rise in the preform material of at least 120° C./sec, advantageously at least 150° C./sec, for example at least 200° C./sec, for example 235° C./sec until the desired annealing temperature is reached. Using such a rapid rise in temperature, allows the use of annealing temperatures in the range of 65-98%, for example about 90% of the melting point temperature of the material without undesired deformation or warping of the preform, since the annealing temperature is reached within a very short period of time.

Without intending to be bound by this theory, it would appear that the most critical factor for achieving substantially full annealing and maximum ductility is the maximum annealing temperature reached during the process. Moreover, by shock annealing the material for a very short period of time, full realignment of the grains in the crystalline structure of the preform material appears to be achieved with minimum grain growth, thereby minimizing the loss of material strength resulting from grain growth. In another theory, the degree of anneal is dependent on the total amount of energy transferred into the preform material and using a high energy flow for a short period of time, as in shock annealing enables the transfer of the total amount of energy required for a substantially full anneal over a significantly short dwell time to minimize material deformation or warping and grain growth. Thus, the advantages of shock annealing are that the elevated ductility values and minimum loss in material strength are achieved for the preform material by a simple short-time high-temperature annealing. In addition, the so-called shock annealing causes little or no component deformation or warping of the article, reducing the rejection percentage and obviating any process for straightening the preform. In addition, the shock annealing treatment can be most economically achieved by induction heating of the metal preform.

The inventors have also found that the total amount of energy and the energy density required for achievement of the desired temperature rise and the final shock annealing temperature is dependent on the mass of the preform as well as the efficiency of the induction heating process. The process efficiency in turn is dependent on the ratio between the resistance of the coil and the resistance of the preform as well as the frequency of the current used to generate the electro-magnetic field. The higher the can resistance, the higher the efficiency. The frequency used influences the penetration depth of the electro-magnetic field into the preform material.

In theory, lower frequencies provide for deeper penetration into the material and the higher the frequency the lower the efficiency. Thus, it would be theoretically preferable to use the lowest frequency possible to achieve the highest efficiency and therefore steepest temperature rise. However, the temperature rise achieved at any given location in the preform also depends on the thickness of the preform material at that location and variations in material thickness can lead to localized temperature variations. Those variations are expected to become more pronounced the higher the energy density used, and the higher the efficiency of the process, and can become amplified into uncontrollable temperature spikes leading to localized burning or melting of the preform material.

To test the effects of frequency and wall thickness, preforms of different wall thickness were exposed to an electro-magnetic field of constant energy density but variable frequency. The observed correlations between frequency, penetration depth and efficiency, are apparent from the results represented in the following table:

TABLE 1

| F (kHz) | Penetration Depth (in) | Efficiency % | | | |
| --- | --- | --- | --- | --- | --- |
| | | 0.011" wall | 0.013" wall | 0.015" wall | 0.020" wall |
| 300 | 0.0115 | 38.7% | 38.6% | 38.7% | 38.7% |
| 200 | 0.0141 | 38.5% | 38.5% | 38.5% | 38.6% |
| 100 | 0.0200 | 42.0% | 41.0% | 40.0% | 38.3% |
| 50 | 0.0282 | 53.0% | 49.2% | 46.0% | 38.0% |

As is apparent from the results listed, wall thickness, frequency and efficiency were correlated as theoretically expected while the penetration depth exceeded the wall thickness. However, the impact of wall thickness on the efficiency became much reduced at 100 kHz and virtually disappeared at 200 kHz. That means the danger of localized temperature spikes due to material thickness tolerances, which spikes are exaggerated at higher energy densities, can be significantly reduced by using higher frequencies than those theoretically practical. Frequencies of 10 kHz to 600 kHz can be used in the process of the invention, as long as a careful balance is struck between power input (power density) and frequency to minimize the risk of localized burning or melting in a preform of given mass, resistance and wall thickness. However, due to the reduced effect of wall thickness on the heating process efficiency at higher frequencies, a frequency range of 100 kHz to 400 kHz was found practical. Moreover, material density and thickness tolerances are higher in an impact extruded preform than in a preform drawn from sheet material and the frequencies found advantageous for impact extruded preforms are higher than those for drawn preforms. A frequency range of 200 kHz to 300 kHz was found practical with impact extruded preforms. A frequency of 300 kHz was found most practical for impact extruded preforms of 0.013" to 0.018" (0.330 mm-0.457 mm) wall thickness.

The strains on the material of a metal preform during necking and/or pressure forming may exceed the formability of the work hardened preform, especially when an impact extruded preform is used, which has a high dislocation density. Pressure forming of an impact extruded preform will generally lead to material failure upon expansion past 3% of the first diameter of the preform (initial or starting diameter). Therefore, for improved formability and expandability, the metal preform in one embodiment in accordance with the invention is subjected to shock annealing after impact extrusion and prior to any further forming steps.

Annealing of the work hardened preform makes the preform more ductile. The inventors have found that conventional annealing methods heating the preform in an oven or partially annealing the preform by inductive heating are unsatisfactory for the achievement of elevated expandability and deformability of the preform material in an impact extruded preform. The inventors have further found that shock annealing of the preform prior to any shaping or expansion will maximize the expandability and deformability of the preform. Shock annealing is defined in this description as heating the material to be annealed to achieve a temperature rise in the material of at least 120° C./sec, to reach an annealing temperature in the range of 65%-98% of the melting point temperature of the metal. A temperature rise of at least 150° C./sec was found advantageous, for example at least 200° C./sec, or 235° C./sec, and at most 250° C./sec. After sufficient heating time to reach the preselected final annealing temperature, the heating is stopped and the material is allowed to cool. The inventors have found that shock annealing is most advantageously achieved by using inductive heating with a power input in the range of 10 kW to 20 kW and a power density of 25-100 W/cm$^2$ of preform material, for treatment times (dwell times) in the range of 0.3 to about 4 sec. Moreover, the penetration depth of the inductive field into the material to be annealed and the efficiency of the inductive heating process may be controlled by the frequency of the inductive current used to generate the inductive field. The inventors have found that lower frequencies provide deeper penetration and higher efficiency, while higher frequencies provide more shallow penetration and lower efficiency. Frequencies in the range of 10 kHz to 600 kHz can be used with frequencies in the range of 200 kHz to 400 kHz being advantageous and a frequency of 300 kHz having been found to provide an advantageous compromise of penetration depth and efficiency.

Shock annealing can also be used for the annealing of preforms made from sheet material. Table 2 below illustrates the expected effect of partial or full annealing using conventional methods as disclosed in U.S. Pat. No. 5,058,408, U.S. Pat. No. 6,349,586 and U.S. Pat. No. 5,776,270 on the expandability of a preform, as compared to shock annealing in accordance with the invention. The results expected upon a 20% PRF expansion of preforms annealed with the prior art methods are compared to those achieved with an impact extruded aluminum preform (38 mm diameter) shock annealed and expanded in a PRF setup by at least 25% in accordance with the invention. Power input was calculated on the basis of total power input and coil diameter. Material failure means the presence of micro-perforations, visible perforations or stress cracking at a bending radius in the expanded region of the sidewall of 5 mm or less.

TABLE 2

| Annealing Method | Annealing Temperature range | Dwell time in seconds | Power input W/in$^2$ | Can size OD mm | Material Failure |
|---|---|---|---|---|---|
| U.S. Pat. No. 5,058,408 | 450-650° F. 232-343° C. | 2 | 1020 | 63.50 | yes |
| U.S. Pat. No. 5,776,270 | 450-700° F. 232-371° C. | 2 | 943 | 66 | yes |
| U.S. Pat. No. 6,349,586 | 450-650° F. 232-343° C. | 2 | 1100 | 63.5 | yes |
| Shock anneal | 840-1100° F. 450-600° C. | 2 | 8824 | 38 | no |

The inventors have further surprisingly discovered that despite the significant dislocation density in the material of an impact extruded preform, an impact extruded preform including differentially shock annealed regions, wherein not all regions of the preform are substantially fully annealed, can be successfully used for forming with the PRF process. The term differentially shock annealed portions as used in this disclosure defines adjacent regions in the preform which differ in degree of annealing, whereby the degree of annealing can range from partial annealing to substantially full annealing, as long as those regions subject to the largest expansion or deformation during the downstream pressure forming process have been substantially fully annealed. The inventors have found that substantially fully shock annealing only those regions of the preform which are subject to elevated strain during molding is sufficient, as long as the remaining regions of the preform are at least 70% annealed, since some regions of the preform, such as those at the closed bottom end, can be produced at approximately the final shaped size. This may speed up the forming process and reduce power consumption. Choosing a final shape that reduces the amount of material that is stretched during pressure forming also reduces the regions of the preform that require a higher ductility and hence require full shock annealing. The energy costs and manufacturing cycle times may be even further reduced by using a movable electro-magnetic field for induction heating.

In the exemplary embodiment, the preform is annealed by generating an electro-magnetic field of an energy density of about 25 W/cm$^2$ to about 100 W/cm$^2$ of the preform material, advantageously about 40 W/cm$^2$ to about 90 W/cm$^2$, for example 86 W/cm$^2$, for inducing a current in the preform and selectively exposing a first region of the preform to the electro-magnetic field for sufficient time to achieve a shock annealing of the first region, and thereafter selectively exposing the remaining regions of the preform to the same electro-magnetic field for the same dwell time to shock anneal the entire preform to a substantially full anneal. It is also possible to use fields of differing energy density for different regions of the preform, or to use the same energy density for all regions, but to vary the dwell time to achieve shock annealing of the different sections for a 70-100% anneal. The individual regions of the preform can be sequentially exposed using a single induction coil, or simultaneously exposed using a segmented coil. If a single coil is used, relative movement between the electro-magnetic field and the preform is achieved by either moving the coil relative to the preform, or moving the preform relative to the coil, or both.

An exemplary setup for selectively exposing one or more regions of the preform to the electro-magnetic field is illustrated in FIG. 1. The setup includes a base 60, a mandrel 62 mounted to the base, for example in a vertically upright position, an induction heater mount 64 and an induction heater 66, including an induction coil 70. The induction heater 66 with coil 70 is mounted to the mount 64 so that coil 70 is coaxial with mandrel 62 and movable between a loading position A at the top of mount 64 to a fully lowered position B (illustrated in broken lines).

Figure 2:
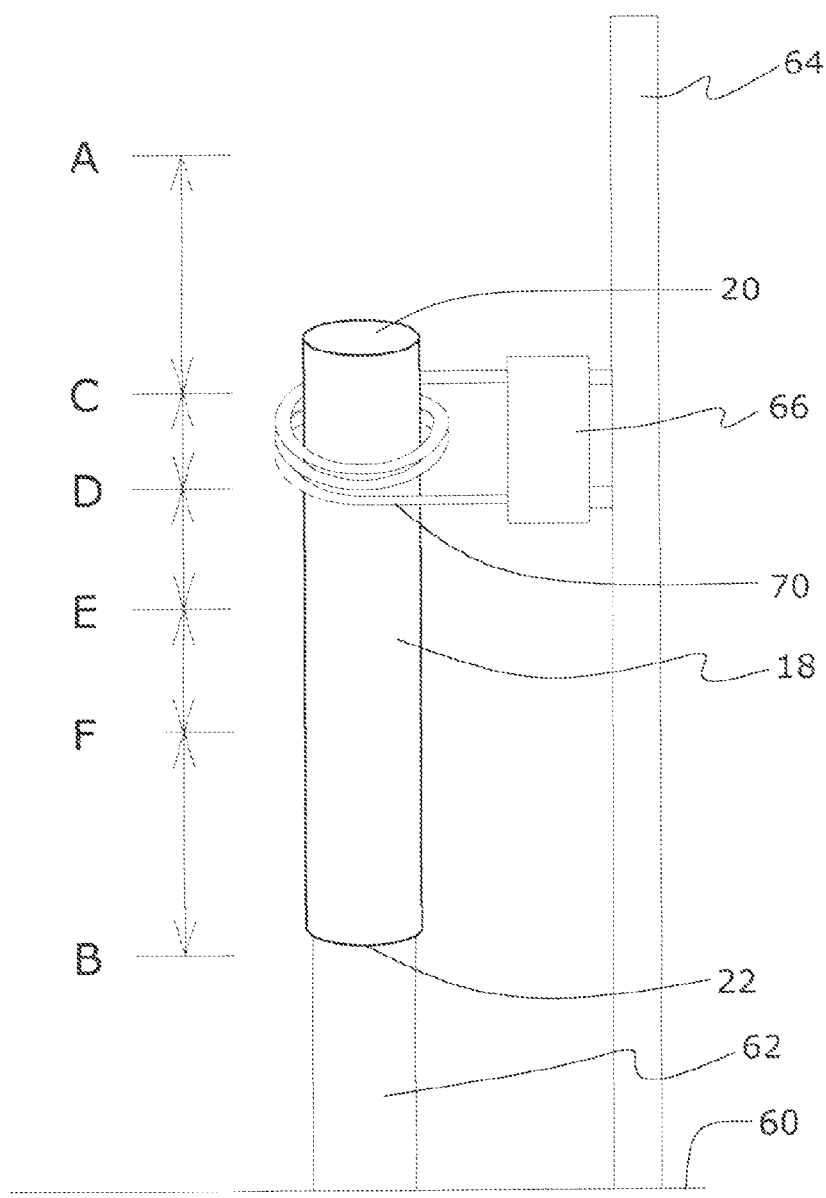
FIG. 2 shows the tooling setup of FIG. 1 with a preform positioned on the mandrel and the induction coil moving through a first region adjacent the closed end of the preform.

The sequential exposure of different regions of the preform will be discussed in the following with reference to FIGS. 2 to 5. FIG. 2 shows a preform 18 placed on the mandrel 62 with the closed end 20 resting on a dome shaped top end 63 (see FIG. 1) of the mandrel 62 and the open end 22 oriented downward so that gravity holds the preform on the mandrel. Arrangements in which the mandrel and induction heater mount are oriented other than vertical and the preform is held on the mandrel by means other than gravity, for example by a vacuum pressure, can also be used. The terms upper end, open end and upper open end are interchangeably used throughout this specification and all define the open end of the preform, while the terms bottom end, closed end and closed bottom end are interchangeably used throughout this specification and define the closed end of the preform.

In the exemplary process discussed and solely for ease of reference, the preform is divided into axially transverse sections (regions) A-C, C-D, D-E, E-F and F-B. Those sections may represent the closed end of the preform (A-C) a bottom end of the sidewall adjacent the base (C-D), a lower midsection of the sidewall (D-E), an upper midsection of the sidewall (E-F) and a neck of the preform (F-B). By moving the induction heater 66 from position A to position B, each section of the preform can be induction heated individually and in sequence with the respectively adjacent portions. In the illustrated example, the lower end of the sidewall is annealed by movement of fully energized coil 70 over section C-D (FIG. 2), the lower midsection of the sidewall is heated less by moving the coil 70, partially energized (as illustrated by the broken lines), over section D-E (FIG. 3), the upper midsection is annealed by movement of fully energized coil 70 over section E-F (FIG. 4) and the neck of the preform is minimally annealed by moving the lightly energized coil 70 quickly over the section F-B (FIG. 5), or not annealed at all. The annealing temperature achieved in each section will depend on the size and frequency of the current flowing through coil 70, the size, diameter and number of windings of the coil 70, the spacing of the coil 70 from the preform, the resistance ratio between the coil and the preform, and the rate of advancement of the induction heater 66 in each section. All of these structural features of the coil 70 have an effect on the energy density in the field generated by the coil. In the illustrated example, a coil capable of generating a field with an energy density of 25-100 $W/cm^2$, for example about 86 $W/cm^2$, was used. The power input to the coil was 10-20 kW, for example 15 kW. The spacing of the coil 70 from the preform 18, the size of the coil and the number of windings all influence the field density and are generally fixed. However, each of the remaining parameters can be controlled independently to control the final annealing temperature achieved in the region of the preform within each section and to control the speed of the temperature increase in each region. Accordingly, each region can be heated at a separate temperature. For example, if the neck portion of the preform is to be significantly compressed during necking, it may be desirable to substantially fully anneal the neck portion and heat the whole neck portion to an annealing temperature of 525° C.

The induction heater may include at least one induction coil 70, such as a solenoid coil, for inducing an electromagnetic field in the preform 18. The induction coil can include multiple coil members (not shown) or a continuous coil member with multiple windings, as schematically illustrated in FIGS. 1 to 5. The induction coil may be a hollow tube to allow for cooling of the coil when higher currents are applied. In the exemplary embodiment, the induction coil is formed of ¼ inch square copper tubing and the inner diameter of the coil is adjusted to create a minimum spacing of 1 mm from the preform at all times. Suitable induction coils are commercially available (Fairview Coil Fabrication (FCF), Scottsville, N.Y.). In general, the coil is shaped and sized to generate the electromagnetic field uniformly throughout the region of the preform in which the inductive current is induced.

The induction coil can be electrically connected to a power source by various devices including conductive wire or conductive tubular connections. The tubular connections can be formed by extensions of the copper tubing that forms the induction coil. In the exemplary embodiment, the power source provides an electrical current, for example, an alternating current of about 380V at 300 kHz. The current is conducted through the induction coil and induces an electromagnetic field within the preform. The annealing temperature reached in the preform can be determined by monitoring the power supplied by the power source. The penetration depth and efficiency of the inductive field in the material to be annealed can be controlled by the frequency of the inductive current. Lower frequencies provide deeper penetration at higher efficiency, while higher frequencies provide lower efficiency at more shallow penetration. Frequencies in the range of 10 kHz to 600 kHz can be used with frequencies in the range of 200 kHz to 400 kHz being advantageous. In the exemplary embodiment, a frequency of 300 kHz, was used, providing a good compromise of penetration depth and efficiency.

When the induction coil winding is tubular and defines a passage for circulating a cooling fluid, the coil can be connected by one or more hoses, pipes, tubes, or other conduits to a coolant source. A pump can be provided for circulating the cooling fluid from the coolant source through the induction coil and back. This allows the use of higher currents inducing fields with higher energy densities, since overheating of the coil can be prevented by circulating a cooling fluid through the coil.

Molding Process

U.S. Pat. No. 7,107,804 (incorporated by reference herein in its entirety) discloses the pressure-ram-forming process (PRF) wherein a metal container of defined shape and lateral dimensions is formed both by fluid pressure, applied either internally or internally and externally, and by the translation of a ram driven by a shaft. In the method disclosed, a hollow metal preform formed by a draw, re-draw or back extrusion process from a metal sheet and having a closed end, is placed in a die cavity laterally enclosed by a die wall defining the shape and lateral dimensions of the finished container. A ram located at one end of the die cavity is translatable into the cavity. The preform is positioned in the die with the closed end being positioned in proximate facing relation to the ram. The preform is initially spaced inwardly from the die wall, but upon being subjected to the fluid pressure expands outwardly into substantially full contact with the die wall. This imparts the defined shape and lateral dimensions to the preform. After the preform begins to expand but before expansion of the preform is complete, the ram is translated into the cavity to engage and displace the closed end of the preform in a direction opposite to the direction of force exerted by fluid pressure and to deform the closed end of the preform inward. The defined shape, in which the container is formed, may be a bottle shape including a neck portion and a body portion larger in lateral dimensions than the neck portion. The die is generally a split die, which is separable for removal of the formed container and allows for a defined shape that may be asymmetric about the long axis of the cavity.

Figure 12:
FIG. 12 is a side view of a solid aluminum slug in the shape of a disc with one beveled edge, for use in impact extrusion of a metal preform.
Figure 13:
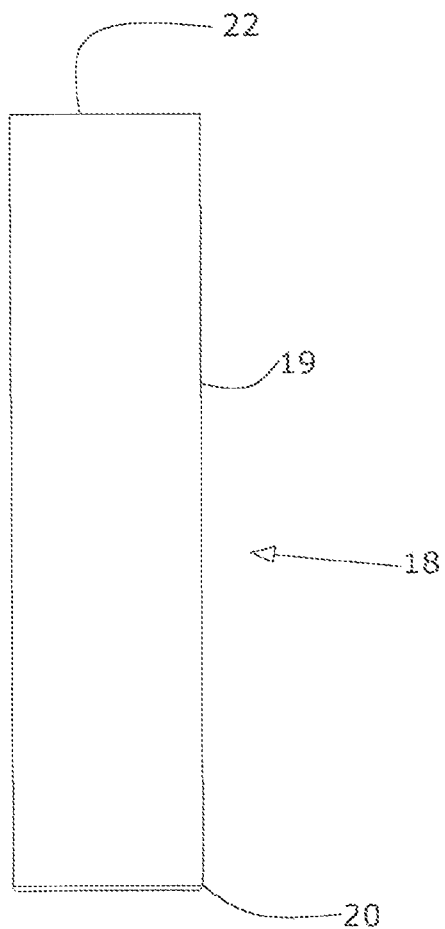
FIG. 13 is a partial axial cross-section of an impact extruded preform made from the slug of FIG. 12 and being a substantially hollow cylinder with an open end, a side wall and a closed end, as used in the process illustrated schematically in FIGS. 6 to 11.

Necking of the preform may occur in the pressure forming step, at any time after annealing and prior to pressure forming, or after pressure forming. There are several options for the complete forming path and the appropriate choice is determined by the formability of the metal sheet or slug being used. The preform can be made from aluminum sheet with a gauge in the range of 0.25 mm to 1.5 mm or from a disc shaped slug 30 of metal as shown in FIG. 12, which is formed by saw cutting the disc from round bar stock or by a smelting process and annealed and surface treated. The preform is a closed-end cylinder that can be made from sheet material by, for example, a draw-redraw (-redraw) process, by back-extrusion, or from a slug by impact extrusion. The diameter of the preform generally lies somewhere between the minimum and maximum diameters of the desired container product, although slightly larger preform diameters can be used, as long as wrinkling or folding of the preform upon closure of the shaping die is avoided.

The preform may be an aluminum preform. The method of the invention could also be used to shape containers from other materials, such as steel, tin, lead, copper, or magnesium, or alloys thereof. Although it will be appreciated by the person skilled in the art that the target annealing temperatures discussed herein in relation to the shock annealing of an aluminum preform will have to be adjusted for the shock annealing of other metals, the principal concept of shock annealing by achieving a temperature rise of at least 120° C./sec is applicable to other types of metal preforms, taking into consideration the specific properties and behaviour of the respective material upon induction heating. For example, steel is magnetic and has higher electrical resistivity and could therefore be heated faster. However, for the same reasons steel heats faster at the surface than deeper inside the side wall. Thus, skin effects may occur in steel preforms with relatively thick sidewalls. These effects are however known and a person with skill in the art would be able to properly select the conditions to execute the shock annealing method of the present invention with preforms of different materials.

An impact extruded preform is shown in FIG. 2. An aluminum slug 30 of 12 mm thickness, 38 mm diameter (first diameter) and generally selected from a 1000 or 3000 series Alloy was used to create the preform. The slug is impact extruded in a conventional manner between an annular die and a cylindrical punch (not shown) to produce a hollow preform 18 having a substantially cylindrical side wall 19, an upper open end 22 and an outwardly concave, flat, or outwardly convex lower closed end 20. The impact extrusion process leaves an irregular upper edge. Trimming an upper portion of the edge of the preform adjacent the upper open end produces a square top edge. After trimming, and brushing if required, the preform is cleaned of lubricant or cutting oil, for example with a caustic wash. Conventional trimming, brushing and cleaning processes can be used.

Shaped containers for use in food packaging may require an interior coating or lacquer to prevent corrosion and spoiling of the contents, or for sanitary reasons. The exterior of the container generally also requires a coating for durability, labeling, decorative appearance and marketing reasons. The interior and/or exterior coatings are generally applied prior to pressure forming, since their application of after blow molding onto the shaped container of complex shape is difficult more difficult than simply applying them to the preform of simple cylindrical shape. However excessive strain or stretching of the preform material during blow molding can damage those coatings, as can preheating of the preform prior to molding.

Figure 14:
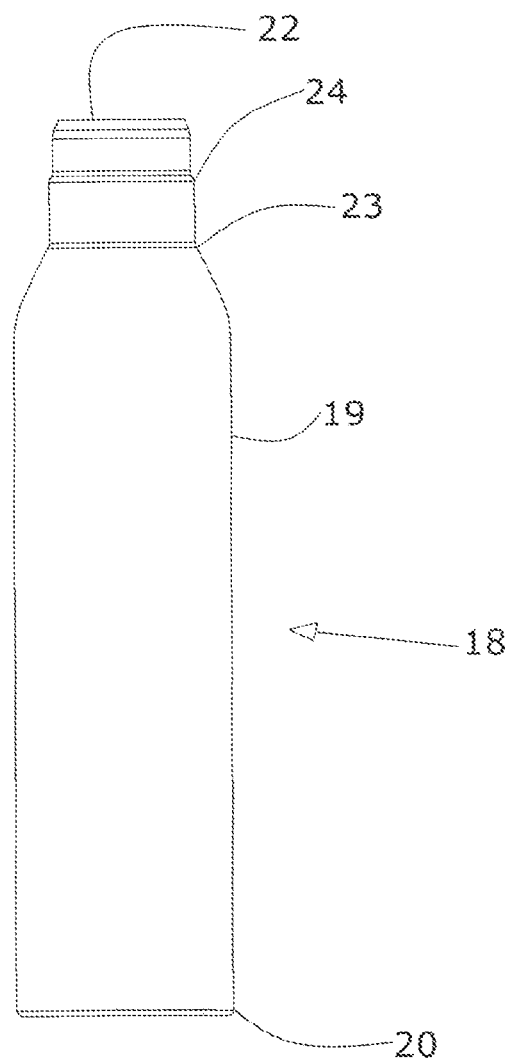
FIG. 14 is a side view of the preform of FIG. 13 after trimming of the upper edge, annealing, internal/external coating, necking of the upper portion, and curling over of the top edge.

A necked preform is shown in FIG. 14, which is obtained by cold working of the upper portion of the preform adjacent the open end to form a neck 23. Various conventional shaping operations can be used for necking of a preform. The preform is generally subjected to a series of dies that draw the preform material gradually into the finished shoulder shape. This process is well known to the person of skill in the art and need not be discussed in more detail herein. The spout can be roll formed in a conventional manner into a collar 24. Trimming, necking and curling the upper end of the preform adjacent to the open end produces the partially finished upper portion of the preform seen in FIG. 14.

One or more surface coatings are preferably applied after annealing and prior to pressure forming and cured on the interior surface of the preform and/or on the exterior surface of the preform. The type of coating may include any type of known coating for containers of this type, such as a base or primer coating, a printed coating with product labeling, powder coatings, lacquers, clear protective over-varnish coatings, adhesive labels, flex labels, etc.

Figure 15:
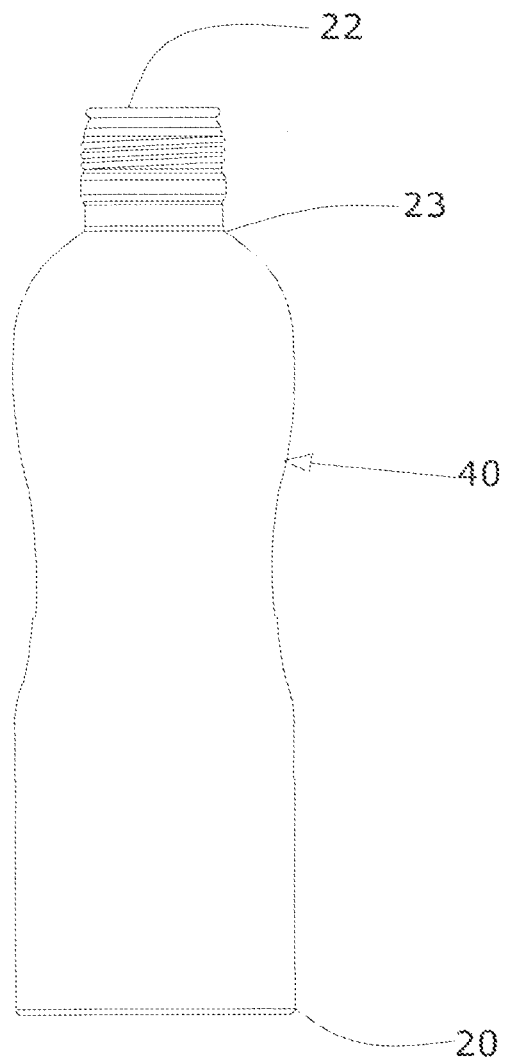
FIG. 15 is a side view of a shaped container in accordance with the invention, having a sidewall defining a basic, symmetrical overall shape after blow molding of the preform has been completed and the upper neck portion has been cold worked to form threads and a bead to receive a tamper evident cap closure.
Figure 16:
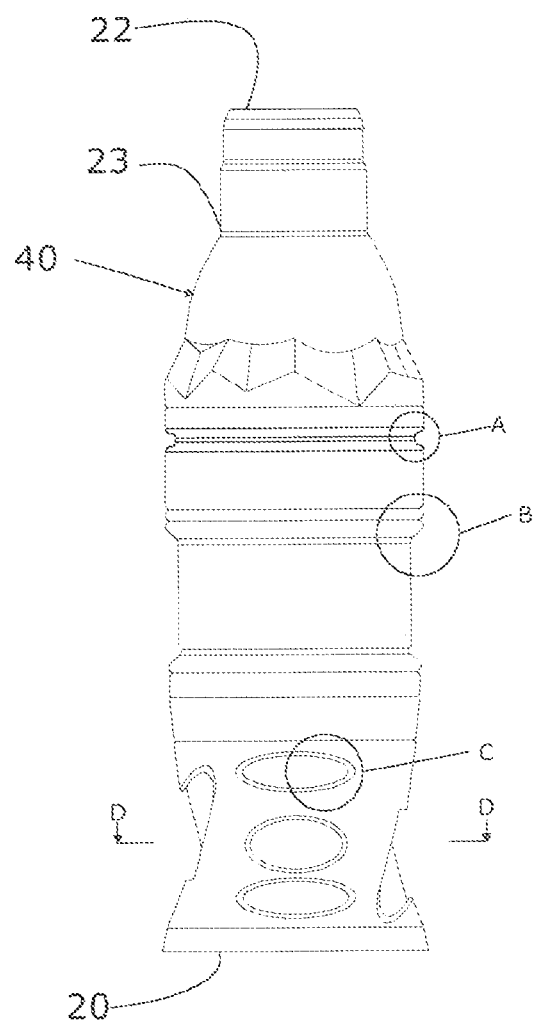
FIG. 16 is a side view of a shaped container in accordance with the invention, having a sidewall defining a more difficult to achieve, asymmetrical overall shape with three-dimensional relief features.
Figure 17:
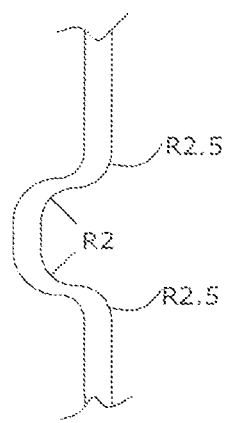
FIG. 17 is a cross-sectional view of Detail A identified in FIG. 16.
Figure 18:
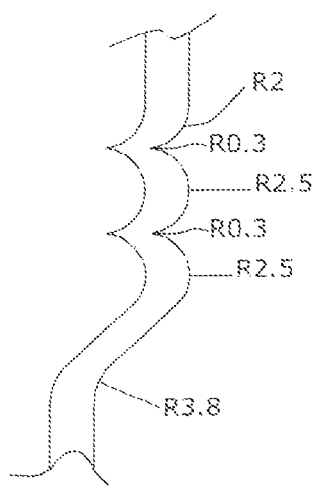
FIG. 18 is a cross-sectional view of Detail B identified in FIG. 16.
Figure 19:
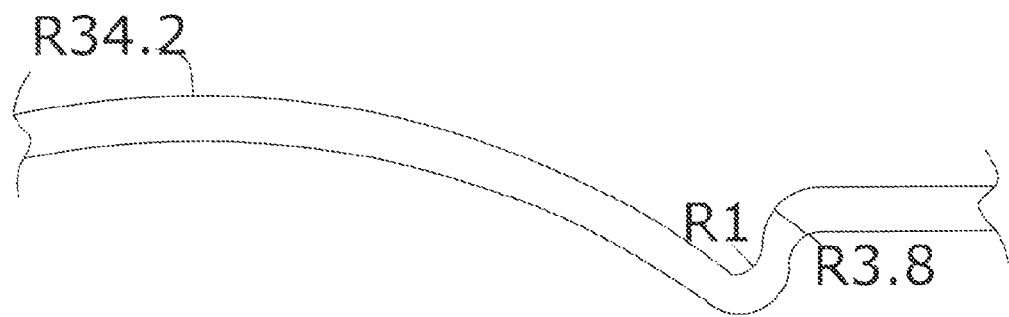
FIG. 19 is a cross-sectional view of Detail C identified in FIG. 16.
Figure 20:
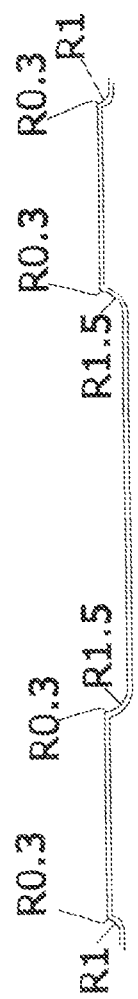
FIG. 20 is a cross-section taken along line D-D in FIG. 16.

As schematically illustrated in FIGS. 5 to 11, the pressure-ram-forming process uses a basic tooling setup including a split die 10 with a profiled cavity 11 defining a bottle shape, a ram 12 that has the contour desired for the bottom of the container (for example a convexly domed contour 12a for imparting a concavely domed shape to the bottom of the formed container) and a shaft 14 that is attached to the ram. For ease of manufacturing, the die is preferably oriented with the bottle shape being axially vertical. Sealing of the preform in the die is aided by orienting the preform upside down. The die is equally oriented with the bottle shape upside down. The two halves of the split die may be mirror image for the production of a symmetrical bottle as shown in FIG. 15, or different (as shown in FIGS. 5-11) for the production of an asymmetrical bottle as shown in FIG. 16. During pressure forming, the two die halves 10a, 10b are pressed together and match in a plane containing the longitudinal axis of the bottle shape defined by the die cavity 11. If preheating of the preform prior to pressure forming is desired, a coil 50 is included in the basic tooling setup, which can be moved axially over the preform 18. Advantageously, the coil 50 is constructed and mounted in such a way that is can be moved along the preform 18 while the preform is suspended in the open die 10 as will be described in the following. An alternate embodiment in which the coil 50 is constructed and mounted in such a manner to move coaxially with the preform on the outside of the closed die 10 is also possible.

Figure 6:
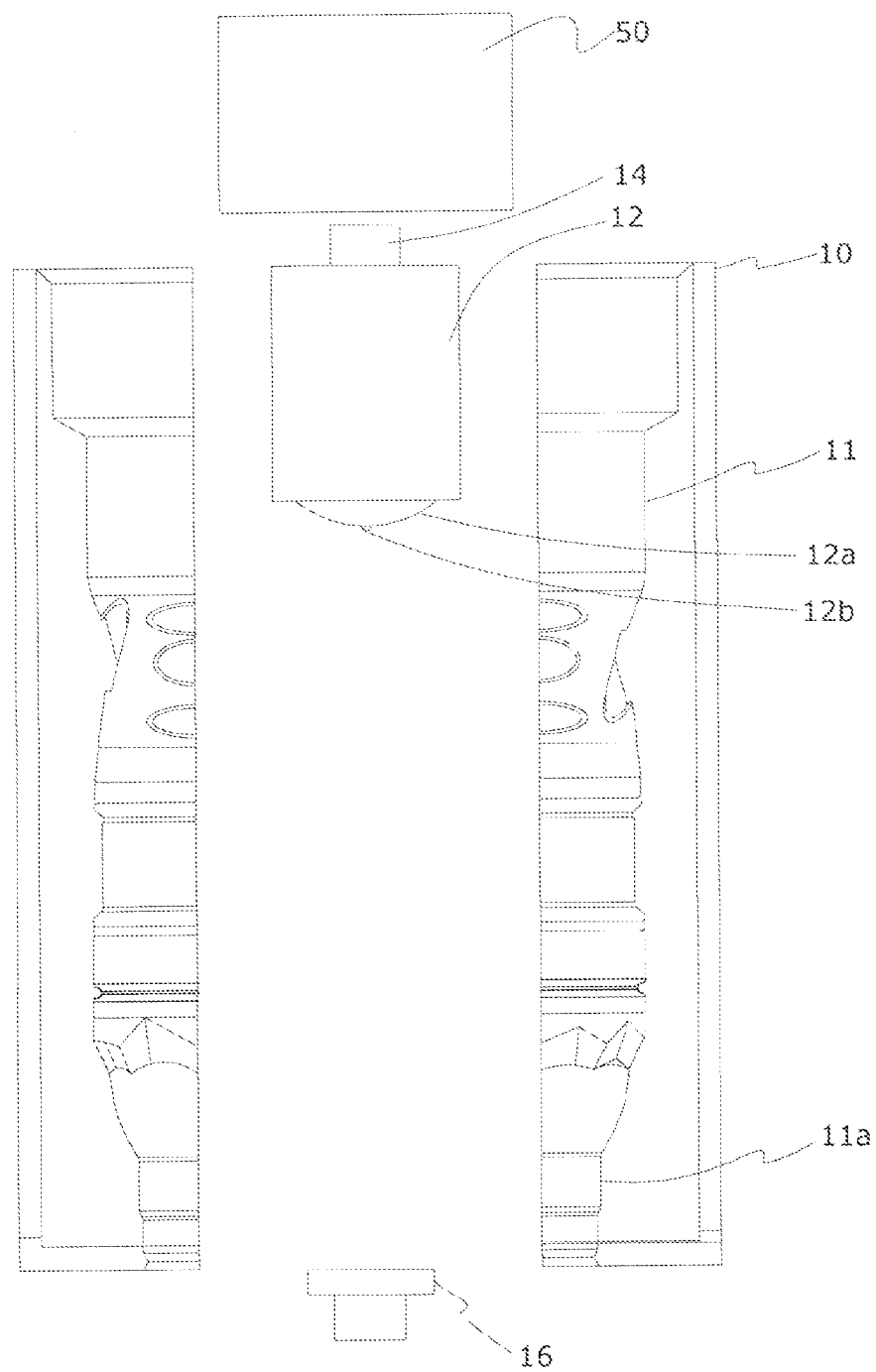
FIG. 6 is a schematic view of a tooling setup for the pressure-ram-forming process in accordance with the invention.

As illustrated in FIG. 6, the preform is positioned in the die cavity 11 below the ram 12 and has a schematically represented pressure fitting 16 at the open end 11a to allow for internal pressurization. At the open end 11a, the minimum diameter of the die cavity 11 is equal to the outside diameter of the preform 18. Pressurization can also be achieved by some other type of pressure fitting.

Figure 9:
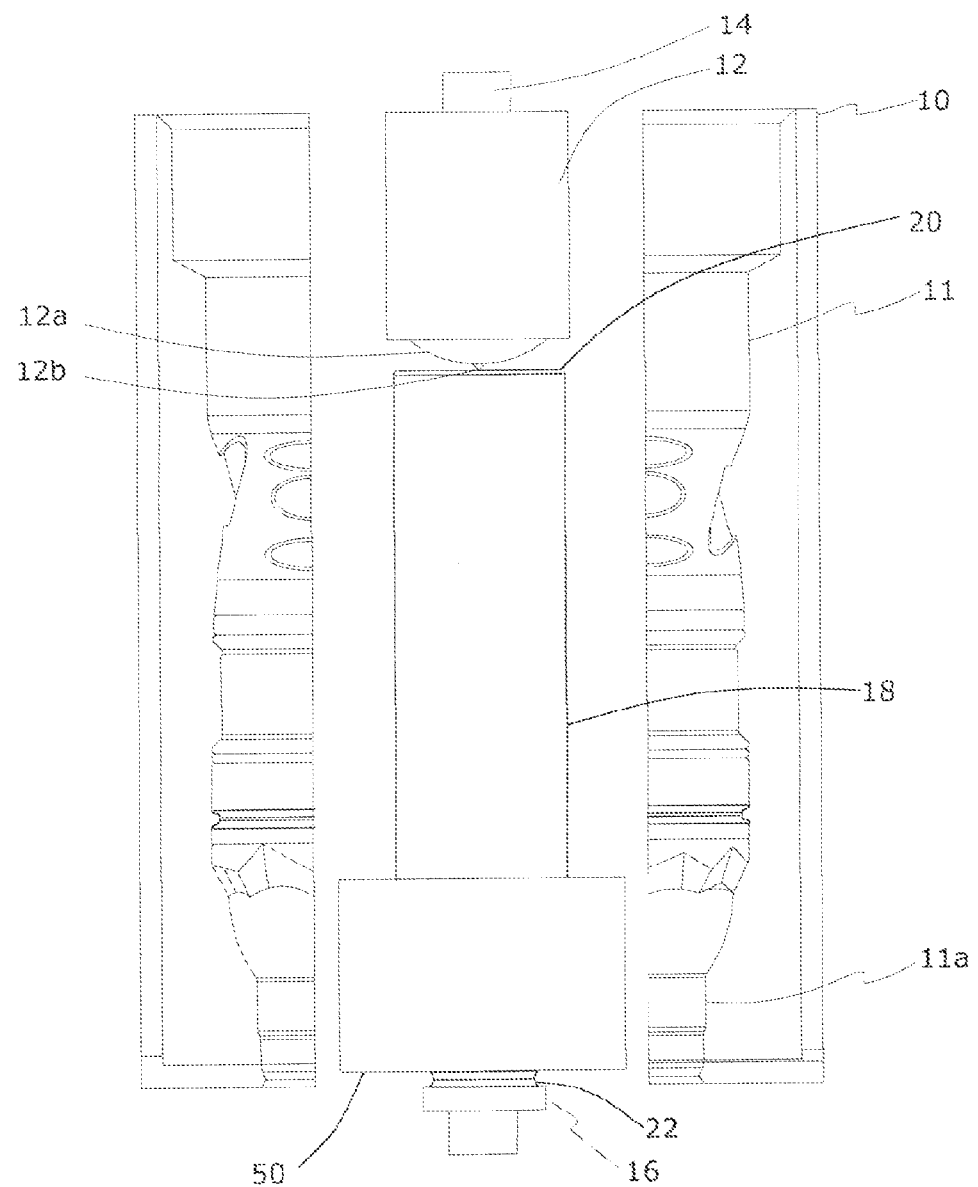
FIG. 9 is a schematic view of the tooling setup of FIG. 6 with the preform inserted and having been preheated, the induction coil being positioned at the open end of the preform.
Figure 10:
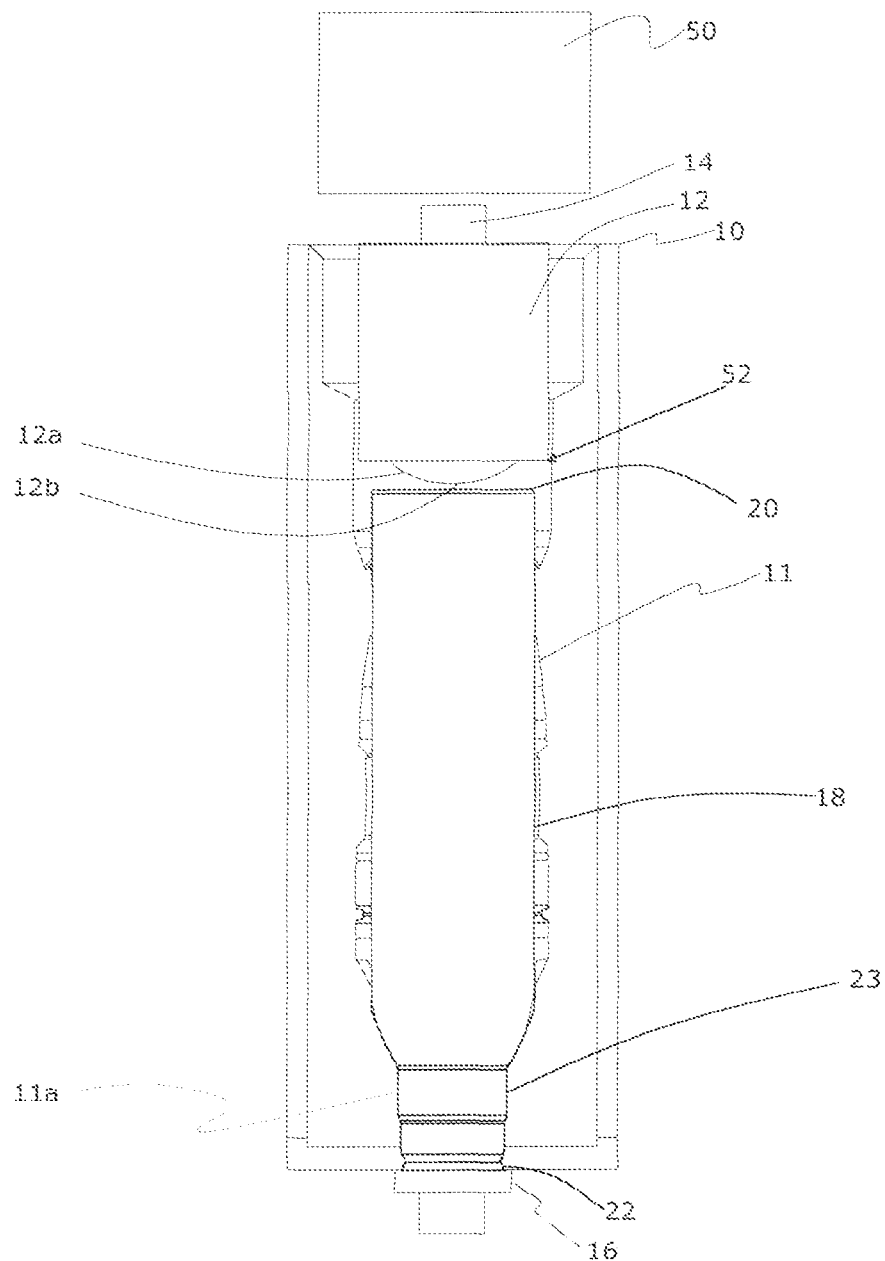
FIG. 10 is a schematic view of the tooling setup of FIG. 6 with the preform in the closed mold, prior to filling with pressurized fluid.
Figure 11:
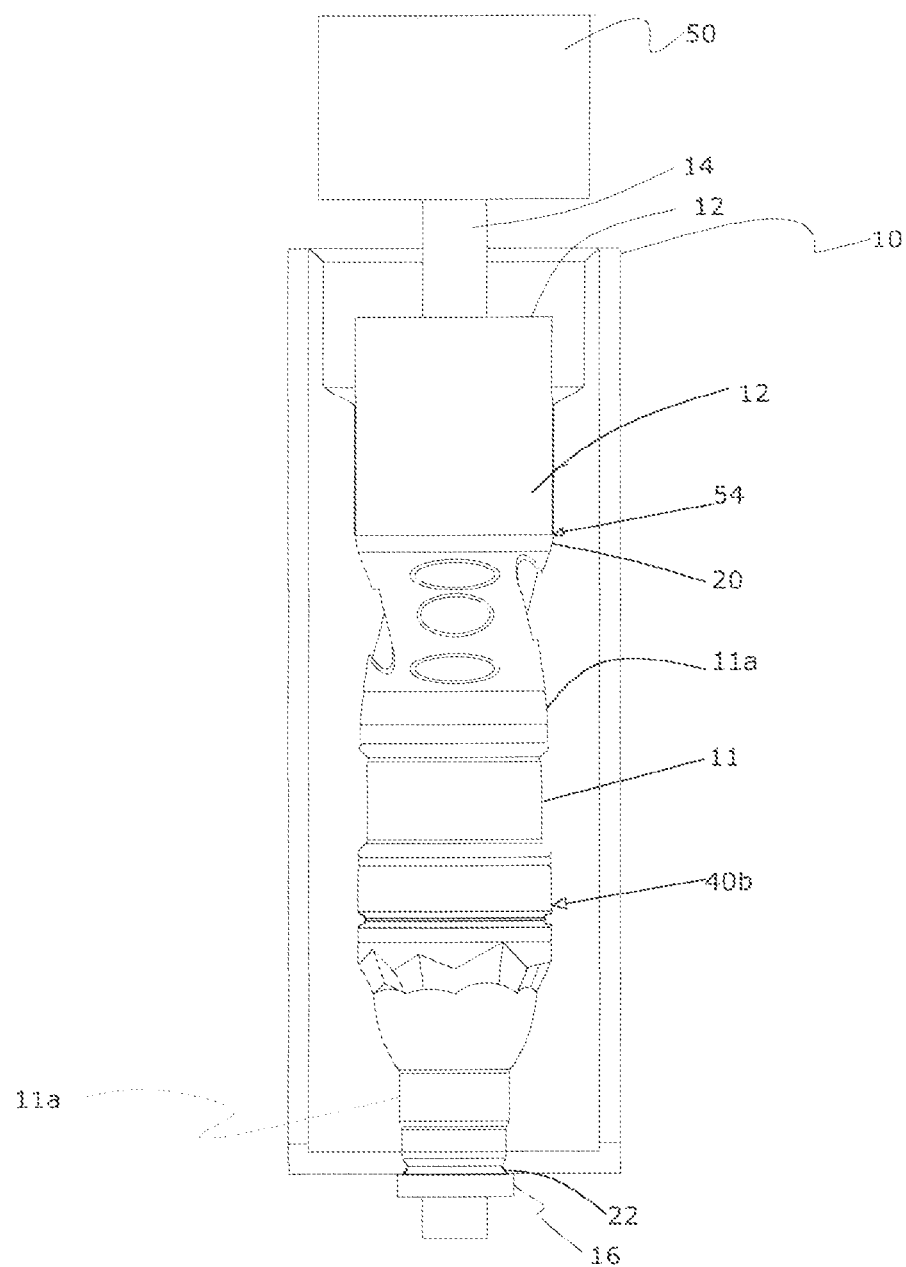
FIG. 11 is a schematic view of the molding setup of FIG. 10 with the preform fully expanded to match the shape of the mold cavity.

The fluid pressure forming step involves closing the die or mold 11 around the preform 18 as illustrated in FIG. 9 and introducing, into the interior of the hollow preform 18, a fluid under such pressure as to cause the preform 18 to expand outward towards the wall of the die cavity 11. Expansion of the preform 18 continues until the wall of the preform is snug against the die wall as shown in FIG. 10. This matches the shape and lateral dimensions of the expanded preform 18 to those of the cavity 11, so that the preform takes on the desired shape.

Compressible or non-compressible fluids can be used for pressurization of the preform. If liquids are used, care must be taken to limit the forming operations to temperatures below the boiling point of the liquid. Once the desired shape is achieved, the pressurizing fluid pressure is released, the split die is opened and the formed container as shown in FIG. 4a or 4b (depending on the shape of the die used) is removed from the die.

In the illustrated exemplary embodiment, the preform 18 is a hollow cylindrical aluminum workpiece with a closed lower end 20 and an open upper end 22, having an outside diameter equal to the outside diameter of the neck of the bottle shape to be formed. The motion of the shaft 14 and the rate of internal pressurization are such as to minimize the strains of the forming operation and to produce the desired shape of the container. Neck and side-wall features result primarily from the expansion of the preform due to internal pressure, while the shape of the bottom is defined primarily by the motion of the shaft and ram 12, and the contour of the ram surface facing the preform closed end 20.

The synchronization of the preform pressurization with the advance of the shaft and ram limits axial stretching of the preform under the influence of the supplied internal pressure. While the preform is being expanded, its axial length decreases. By advancing the ram during expansion of the preform, detachment of the closed end of the preform from the side wall is prevented. Moreover, as the preform approaches the final, expanded shape, advancement of the shaft 14 continues to force the ram against the closed end of the preform to deform the closed end of the preform upwardly until it matches the shape of the ram.

Figure 7:
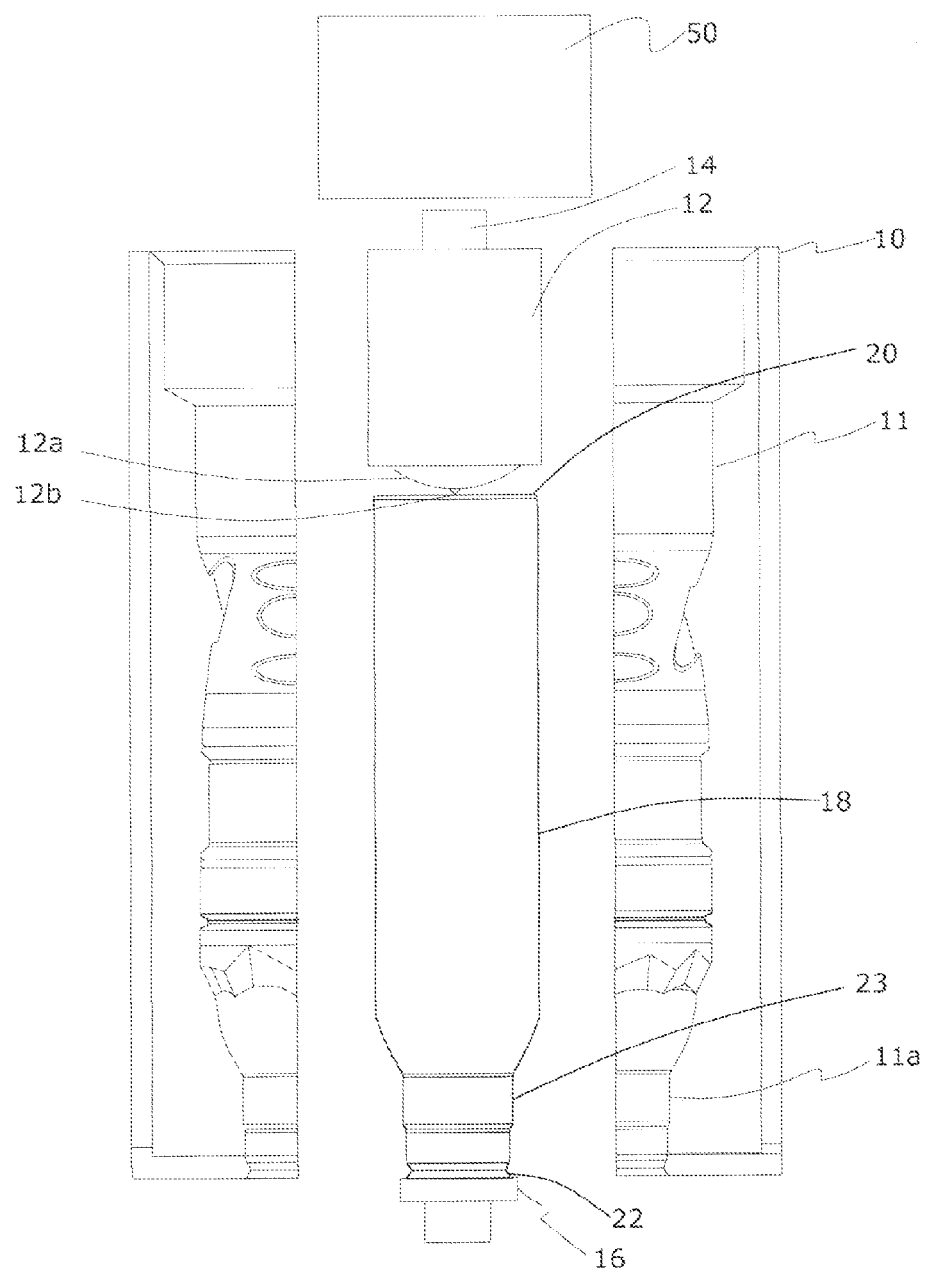
FIG. 7 is a schematic view of the tooling setup of FIG. 6 with a preform inserted therein.
Figure 8:
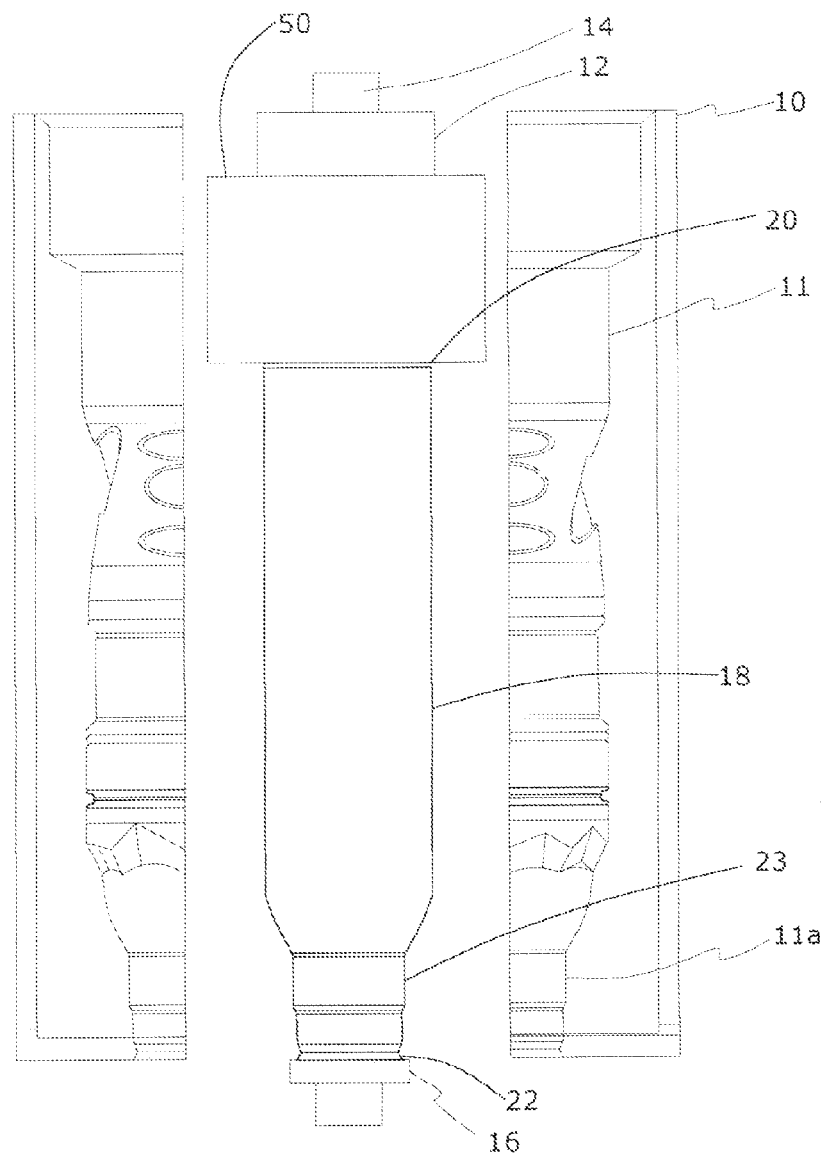
FIG. 8 is a schematic view of the tooling setup of FIG. 6 with the preform inserted and prior to preheating, with the induction coil positioned at the closed end of the preform.

Prior to blow molding, the preform can be preheated either in the mold in the loading position (as shown in FIGS. 7 and 8) or outside the mold in an exterior induction heater (not shown).

Preheating

Preheating of the preform can be achieved with heaters within the mold, exterior heaters, or induction heaters exterior or interior to the preform. In one embodiment of the shaping process in accordance with the invention, an aluminum alloy preform 18 with a coating is used, which is preheated to a temperature of less than or equal to 200° C., in order to minimize damage to the coating, while providing greater ductility for blow molding.

In a second embodiment, the process includes preheating a selected region of the side wall of the preform by heating to a preheating temperature with an induction coil 50. The induction coil 50, and for example the electro-magnetic field generated by the induction coil and the currents in the preform induced by the field, heat the material more quickly and with less energy than, for example, a radiant heater. Further, an induction heater can be directed to heat only the selected regions while maintaining the remaining regions of the side wall and remaining regions of the closed end below the preheating temperature. A temperature gradient between the preheated and the remaining regions will naturally occur due to the thermal conductivity of the aluminum material of the preform. The preheating step can also be performed with a first induction heater disposed externally to the preform and a second induction heater disposed internally to the preform. The small size of induction heaters enables access to the interior of the container preform. Induction heating also exposes any coatings to heat for a shorter period of time thereby reducing the potential for heat damage to the coating during the pressure forming. Induction heaters of the principal construction discussed above in relation to the annealing step can be used for the preheating step.

In the second embodiment of the preheating step in accordance with the invention, shock preheating of the preform 18 can be used in which the coated preform is subjected to inductive heating to achieve a temperature rise in the preform of at least 120° C./sec. When shock preheating is used, the preform material can be heated to a preheating temperature in the range of 100 to 300° C. for a treatment time of less than 4 sec. In another embodiment, the preform can be shock preheated to a preheating temperature in the range of 100 to 200° C. for a treatment time of 0.1 to 2 sec. Conventional coatings applied to food grade containers have a temperature tolerance limit, above which heat damage to the coating occurs, generally in the range of 100 to 200° C. Thus, preheating of the preform during blow molding is generally limited to a temperature below the temperature tolerance limit of the coating. However, when shock preheating is used, the preform material can be heated to a temperature up to 50% above the tolerance limit, which is very advantageous for the pressure shaping step, since the higher the preheating temperature, the more ductile the preform material, the more expansion the material will withstand prior to material failure. Despite the temperature being in excess of the temperature tolerance limit, damage to the coating is minimal or avoided by the generally short treatment time and the generally low heat conductivity of the coating as well as the cooling of the coating by contact with the surrounding air, which is usually at or near ambient temperature. In this exemplary embodiment of the process of the invention, a treatment time of less than 2 seconds was selected. The energy density of the electro-magnetic field used for shock preheating in the exemplary process was selected as described above in relation to the shock annealing process.

In the second embodiment of the preheating of the preform in accordance with the invention, the preform 18 is preheated while positioned within the opened die 10 and before enclosure of the preform within the die cavity 11, as will be discussed in the following with reference to FIGS. 7 and 8. In the exemplary process, the preform 18 is preheated by generating an electro-magnetic field with coil 50 for inducing a current in the preform 18 and selectively exposing first and second regions 18*a*, 18*b* of the preform to the electro-magnetic field for induction heating of the first and second regions each to an annealing temperature. The first and second regions 18*a*, 18*b* are preferably exposed by moving the electro-magnetic field relative to the preform 18. This is achieved either by moving the preform through the field, by moving the field, as illustrated in FIGS. 7 and 8, wherein the coil 50 generating the field is moved over the preform 18, or within the preform (not illustrated), or by doing both, moving the preform and the field (not illustrated). In one embodiment, the first and second regions are first and second transverse sections of the preform 18.

Figure 3:
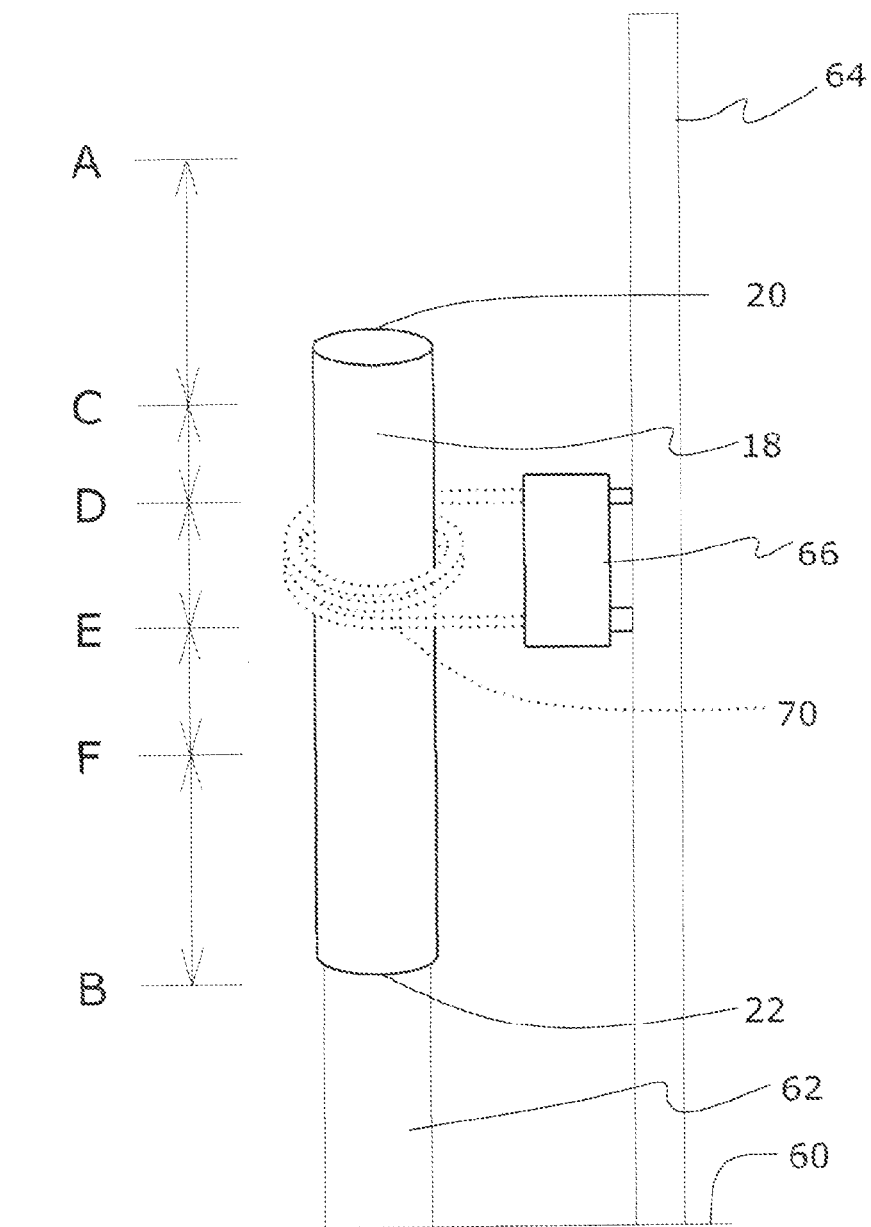
FIG. 3 shows the tooling setup of FIG. 1 with a preform positioned on the mandrel and the induction coil moving through a second region without being fully powered.
Figure 4:
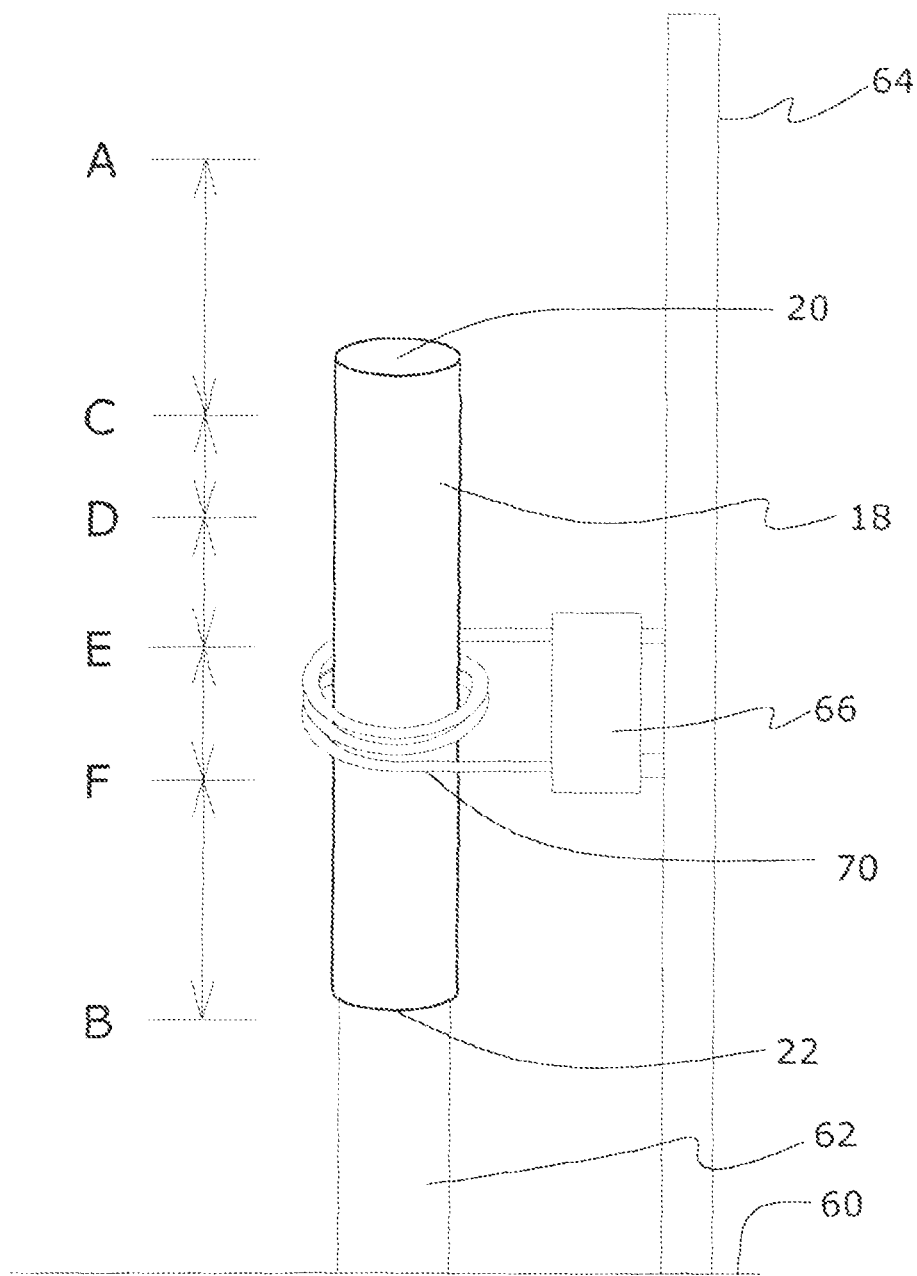
FIG. 4 shows the tooling setup of FIG. 1 with a preform positioned on the mandrel and the induction coil moving through a third region.
Figure 5:
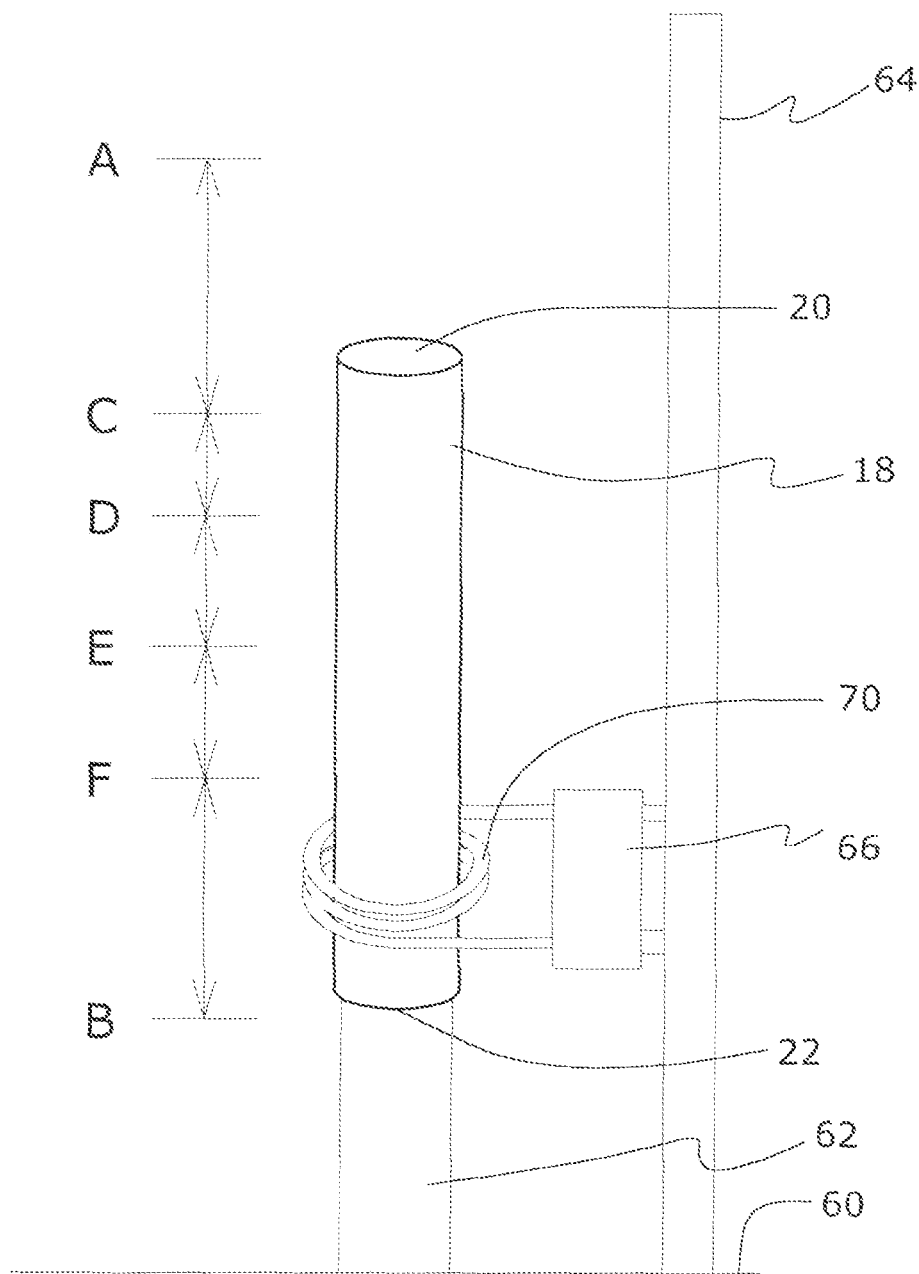
FIG. 5 shows the tooling setup of FIG. 1 with a preform positioned on the mandrel and the induction coil moving through a fourth region adjacent the open end of the preform.

To progress from the preform shape of FIG. 3 to the fully molded can 40, 40*a* in the shape shown in FIGS. 15 and 16 respectively, the die or mold 10 is closed to surround the preform and the upper open end of the preform is sealed as shown in FIG. 9. The preform is filled with pressurized fluid (gas or liquid) and, as noted above, the ram 12 moves from the loading position 52 shown in FIGS. 6, 8 and 9, wherein only a centering point 12*b* on the convex portion 12*a* of the ram 12 (FIGS. 5-7) engages the closed end 20 of the preform (FIG. 7), to the molded position 54, wherein the whole convex portion 12*a* of the ram 12 engages the closed end 20 of the preform 18 (see FIG. 10) and forms the closed end into a concave bottom for the finished container 40*a*, 40*b*.

A shaping pressure of 60 bar or less was used in the exemplary process and any pressures above 20 bar have been found to be adequate. The combined interior pressure and movement of the mold base expand the selected and annealed regions of the side wall of the preform radially outwardly to engage the interior side surface of the mold. The preform closed end is also formed from an outwardly concave, flat or convex shape to an outwardly concave shape matching the mold base.

The contact force between the closed end of the preform and the centering point 12*b* on the ram 12, which contact force is generated by the shaping pressure on the interior surface of the preform closed end is generally sufficient to restrain the closed end in the die against lateral movement during expansion of the preform. However, in some instances, the fluid pressure inside the preform can be inadequate to create a sufficient contact force to prevent lateral movement of the preform closed end. For those situations, the preform can be provided with an alignment dimple in an exterior surface of the closed end for engagement by a matching alignment protrusion on the ram 12 for example the centering point 12.

Molded Container

The shaping process of the present invention enables the manufacture of shaped metal container in accordance with the invention, which is pressure molded in one expansion step from an impact extruded aluminum preform having a cylindrical sidewall of a first diameter (initial or starting diameter) and a closed bottom end. The shaped metal container includes a closed end (bottom end), for example an inwardly domed bottom end, and a sidewall defining an overall shape of the container. In at least one shaped region, the shaped container has an expanded diameter (second diameter) larger than the first diameter. The sidewall, in the at least one shaped region, further includes a three-dimensional relief structure. The three dimensional relief structure includes at least one relief feature deformed from the sidewall to a relative elevation of 0.1-10% of the second diameter at the location of the relief feature and the relief feature includes at least one edge with a bending radius of 0.3-5 mm. The maximum overall expansion of the sidewall at the relief feature is 25% to 50% of the first diameter. An exemplary shaped container with symmetrical shape is shown in FIG. 15, while a shaped container with asymmetrical shape and multiple three-dimensional relief features of variable appearance is shown in FIG. 16. Detail views of certain relief features of the container of FIG. 16 are illustrated in FIGS. 17-20, in which the bending radius at the respective bends and or edges of the relief structure are identified as Rx, whereby R stands for radius and x identifies the size of the respective radius in mm.

By using the shock annealing process in accordance with the invention and, as needed, also the shock preheating process of the invention, shaped metal containers can be manufactured from metal preforms, which containers have a surface relief structure previously not attainable. Using the shock annealing and shock preheating processes in combination, shaped metal containers can be obtained wherein the container sidewall has been subjected in a single expansion step to a maximum overall expansion of 25-45% of the first diameter. The shaped metal containers in accordance with the invention can have one or more relief features of a relative elevation of 5-10% and one or more edges with a bending radius of 0.3-3 mm. The relief features can be a protrusion from the sidewall, or a recess in the sidewall. Shaped containers in which protrusions and recesses are directly adjacent can also be produced. The overall shape of the container can be symmetrical to a longitudinal axis of the container or asymmetrical to the longitudinal axis. As shown in FIG. 15, after blow molding is completed and the container is removed from the mold, threads can be formed on an upper portion of the neck and a curled over bead can be formed on the upper edge of the neck.

Shaping Die

The shaping mold or shaping die 10 used in the exemplary process in accordance with the invention as schematically illustrated in FIGS. 6 to 11 can be formed of any material able to withstand a forming pressure up to at least 60 bar. In one embodiment, the shaping die 10 for use in the pressure forming of metal containers of a predetermined three-dimensional shape, includes a mold body having an interior surface complementary to the predetermined three-dimensional shape. A majority of the body is advantageously made from a material having a thermal conductivity lower than metal. In one embodiment, the majority of the body is made of a heat insulating material. In another embodiment, the material of the body is also electrically non-conductive, for example a plastic material selected from the group of phenolic resins, or other thermoset resins. One exemplary die 10 used in the process of the invention was cast from a phenolic resin-cotton fabric material. Other possible materials are melamine resins, epoxy resins, epoxy resins reinforced with paper substrates, fiberglass substrates or synthetic substrates (combination phenolilc, epoxy, Kevlar, carbon fiber, etc. . . . ). Another exemplary die was provided on the interior surface of the mold with a metal coating applied by metal vapour deposition, for increasing a wear resistance of the interior surface and for providing cooling of the expanded preform upon contact with the die.

EXAMPLE

Preform

Commercially available aluminum slugs made of a Series 1100 or 3000 Alloy, having a 38 mm diameter and 12 mm thickness were impact extruded in a conventional impact extruder setup (Schuler Press) into an cylindrical aluminum preform of 38 mm diameter having a closed, flat bottom and a cylindrical sidewall of about 200 mm height and 0.333 mm thickness. The preform was subjected to conventional trimming, cleaning and brushing treatments, to generate an even top edge, remove extrusion lubricant and provide an overall even external appearance.

Annealing

A commercially available cylindrical induction coil (FCF) of 42 mm diameter and about 50 mm height was used in the annealing treatment. The preform was placed on the mandrel 63 and the coil 70 was moved over the preform at constant speed. A voltage of 380V at a frequency of 300 Hz was applied to the coil at a total energy input of 15 kW. The efficiency of the induction heating process was calculated at about 38%, which translated into a total energy input into the surface area of the preform under the coil of 5.2 kW. At a coil height of 50.8 mm and OD of the can of 38 mm the surface area of the preform under the coil is 85.79 $cm^2$ and thus the power density input into the preform was about 85.8 $W/cm^2$. The speed of advancement of the coil was selected to expose each axial location on the preform for about 2 seconds to the electro-magnetic field generated by the coil. The final annealing temperature reached was 510° C., translating into a temperature rise of about 240° C./sec, at an ambient temperature of about 26° C. Each axial region of the preform was exposed to the electro-magnetic field and thereby heated only for the time required for the coil to pass over the region. Cooling of the region by ambient conditions commenced immediately after passage of the coil. After a complete pass axially along the whole preform, the coil was returned to the starting location.

Coating and Necking

After cooling to a temperature below 100° C., the preform was provided with an interior lacquer coating and an exterior printed label, using conventional technologies. The coated and decorated preform was then subjected to a conventional necking procedure to generate a rimmed neck as illustrated in FIG. 14.

Preheating

Preheating of the preform can be carried out outside or inside the die. When preheated external to the die, the preform is preheated in an intermediate position in order to reduce cycle time and improve machine efficiency. Although external heating could be performed more easily, more cooling of the preform can occur prior to shaping than with preheating inside the die. In this example, the coated and decorated preform was moved into the opened die 10 as illustrated in FIG. 7, and preheated by exposure to a moving electro-magnetic field. A coil of the same dimensions as described above in relation to the annealing step was used.

The energy input into the preform was controlled for the preform material to reach a temperature of 300° C. and to limit the exposure time of any part of the preform material to at most 2 seconds. The energy density supplied into the preform material was of 40 W/cm² and the temperature rise was at most 140° C./sec. In other words, the preform was exposed to a shock preheating process similar to the shock annealing process described above in relation to the annealing step. Differential preheating was achieved by modifying both field strength and coil advancement speed as the coil was moved axially along the preform. After a complete pass axially along the whole preform, the coil was returned to the starting location.

Shaping

The die 10 was closed as shown in FIG. 10, pressurized with compressed air to about 50 bar to force the preform sidewall 18 against the die cavity 11 and the ram 12 was moved into the die to form a concave bottom end on the container. After completion of the shaping process, the die 10 was opened and the shaped container, as illustrated in FIG. 16, was removed from the die.

Although the above description relates to specific preferred embodiments as presently contemplated by the inventors, it will be understood that the invention in its broad aspect includes mechanical and functional equivalents of the elements described herein.

What is claimed is:

1. A method of pressure molding a shaped metal container of a desired shape from a metal preform having a cylindrical body with an open end and a closed end, the method comprising the steps of:
   generating an electro-magnetic field;
   shock annealing at least one region of the metal preform by exposing the preform to the electro-magnetic field for inductively heating a preform material of the metal preform to generate a temperature rise in the preform material of at least 120° C./sec to reach an annealing temperature in the range of 65% to 98% of the melting point temperature of the preform material;
   applying and curing a coating on at least one of an interior surface of the preform and an exterior surface of the preform after the shock annealing step, to create a coated preform;
   differentially preheating the coated preform, or the coated preform after a necking operation;
   fluid pressure forming the annealed preform in a mold with a mold cavity defining the desired shape by pressurizing the preform to expand the preform into contact with the mold cavity for imparting the desired shape onto the preform; and removing the resulting molded container in the desired shape from the mold, wherein the metal preform is shock annealed prior to insertion into the mold and the step of differentially preheating the preform comprises sequentially inductively heating first and second regions of the preform with an electro-magnetic field by sequentially exposing the first and second regions to the electro-magnetic field by moving at least one or both of the preform and the field relative to one another, wherein at least one of the first and second regions is subject to three dimensional deformation during the pressure forming step.

2. The method of claim 1, wherein the first and second regions are heated to a preheating temperature in the range of 100 to 300° C. and the first and second regions are heated for a treatment time of less than 4 sec.

3. The method of claim 1, wherein the step of inductively heating includes generating the electro-magnetic field with a power input of 5 kW to 8 kW.

4. The method of claim 3, wherein the electro-magnetic field has a frequency in the range of 10 kHz to 600 kHz.

5. The method of claim 1, including the further step of impact extruding the preform from an aluminum slug prior to the shock annealing step.

6. The method of claim 5, wherein the first and second regions are heated to a preheating temperature in the range of 100 to 300° C. and the first and second regions are heated for a treatment time of less than 4 sec.

7. The method of claim 5, wherein the step of inductively heating includes generating the electro-magnetic field with a power input of 5 kW to 8 kW.

8. A method of pressure molding a shaped metal container of a desired shape from a metal preform having a cylindrical body with an open end and a closed end, the method comprising the steps of:
   generating an electro-magnetic field;
   shock annealing at least one region of the metal preform by exposing the preform to the electro-magnetic field for inductively heating a preform material of the metal preform to generate a temperature rise in the preform material of at least 120° C./sec to reach an annealing temperature in the range of 65% to 98% of the melting point temperature of the preform material;
   applying and curing a coating on at least one of an interior surface of the preform and an exterior surface of the preform to create a coated preform, which coating has a temperature tolerance limit above which heat damage to the coating occurs;
   differentially preheating the coated preform, or the coated preform after a necking operation, wherein preheating is carried out at a preheating temperature selected to be above and up to 50% above the tolerance limit and a treatment time selected to be less than 2 sec;
   fluid pressure forming the annealed preform in a mold with a mold cavity defining the desired shape by pressurizing the preform to expand the preform into contact with the mold cavity for imparting the desired shape onto the preform, wherein the metal preform is shock annealed prior to insertion into the mold; and
   removing the resulting molded container in the desired shape from the mold.

9. The method of claim 8, wherein the preform is an extruded preform having been impact extruded from an aluminum slug.

10. The method of claim 8, wherein the fluid pressure forming step comprises:
    placing the preform in the mold, the mold having an interior shape complementary to the desired shape of the container and a mold base movable between a loading position and a molded position;
    pressurizing the preform with pressurized fluid for expanding at least one of a first portion of a sidewall of the preform and a portion of the preform closed end into contact with the mold; and
    moving the mold base from the loading position to the molded position to form the preform closed end into an inwardly concave shape.

11. The method of claim 10, wherein the sidewall of the coated preform having a first diameter is expanded in a single pressure forming step (a) to achieve an overall shape of the container and a second diameter 25% to 50% larger than the first diameter, and (b) to generate a three-dimensional relief structure in the expanded sidewall, the three dimensional relief structure including at least one relief feature deformed from the sidewall to a relative elevation of 0.1% to 10% of the second diameter at the location of the relief feature, the relief feature including at least one edge with a bending radius of 0.3 mm to 5 mm.

12. The method of claim 11, wherein the relief feature is one of a protrusion and a recess.

13. The method of claim 8, wherein the preform is expanded in at least one region by 25% to 50% during the single pressure forming step.

14. The method of claim 8, wherein the step of inductively heating includes generating the electro-magnetic field with a power input of 5 kW to 8 kW.

15. The method of claim 8, wherein the electro-magnetic field has a frequency in the range of 10 kHz to 600 kHz.

16. A method of pressure molding a shaped metal container of a desired shape from an impact extruded metal preform having a cylindrical body with an open end and a closed end, the method comprising the steps of:
generating an electro-magnetic field;
shock annealing at least one region of the metal preform by exposing the preform to the electro-magnetic field for inductively heating a preform material of the metal preform to generate a temperature rise in the preform material of at least 120° C./sec to reach an annealing temperature in the range of 65% to 98% of the melting point temperature of the preform material;
differentially preheating the annealed preform;
fluid pressure forming the differentially preheated preform in a mold with a mold cavity defining the desired shape by pressurizing the preform to expand the preform into contact with the mold cavity for imparting the desired shape onto the preform; and
removing the resulting molded container in the desired shape from the mold,
wherein the metal preform is shock annealed prior to insertion into the mold and the step of differentially preheating the preform comprises sequentially inductively heating first and second regions of the preform with an electro-magnetic field by sequentially exposing the first and second regions to the electro-magnetic field by moving at least one or both of the preform and the field relative to one another, wherein at least one of the first and second regions is subject to three dimensional deformation during the pressure forming step.

17. The method of claim 16, wherein the electro-magnetic field has a frequency in the range of 10 kHz to 600 kHz.

18. The method of claim 16, wherein the preform is an extruded preform having been impact extruded from an aluminum slug.

19. The method of claim 16, wherein the step of inductively heating includes generating the electro-magnetic field with a power input of 5 kW to 8 kW.

* * * * *